United States Patent
Lester et al.

(10) Patent No.: US 10,432,605 B1
(45) Date of Patent: Oct. 1, 2019

(54) SCALABLE RISK-BASED AUTHENTICATION METHODS AND SYSTEMS

(71) Applicant: United Services Automobile Association (USAA), San Antonio, TX (US)

(72) Inventors: Michael W. Lester, Fair Oaks Ranch, TX (US); Debra Randall Casillas, Helotes, TX (US); Richard A. Davey, San Antonio, TX (US); Michael Frank Morris, San Antonio, TX (US); Maland Keith Mortensen, San Antonio, TX (US); John David Row, San Antonio, TX (US); Thomas Bret Buckingham, Fair Oaks Ranch, TX (US); Tammy Sanclemente, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/160,797

(22) Filed: Oct. 15, 2018

Related U.S. Application Data

(63) Continuation of application No. 14/034,100, filed on Sep. 23, 2013, now abandoned, which is a
(Continued)

(51) Int. Cl.
   *G06F 19/00* (2018.01)
   *H04L 29/06* (2006.01)

(52) U.S. Cl.
   CPC .................. *H04L 63/08* (2013.01)

(58) Field of Classification Search
   USPC ............ 726/5, 2, 21, 36; 713/150, 163, 181; 380/255, 264, 276
   See application file for complete search history.

(56) References Cited

U.S. PATENT DOCUMENTS

| | | | |
|---|---|---|---|
| 6,252,869 B1 * | 6/2001 | Silverman | H04L 63/18 370/352 |
| 7,389,917 B2 * | 6/2008 | Abraham | G06Q 20/204 235/382 |

(Continued)

FOREIGN PATENT DOCUMENTS

WO   2008061066 A2   5/2008

OTHER PUBLICATIONS

Aho, Alfred V., "Compilers: principles, techniques, and tools", Second Edition, 1038 pages., Pearson/Addison Wesley, 2007.
(Continued)

*Primary Examiner* — Sharif E Ullah
(74) *Attorney, Agent, or Firm* — Perkins Coie LLP

(57) ABSTRACT

The disclosure describes a scalable, risk-based authentication system including a plurality of fraud monitoring engines configured to: analyze user data and organization data, and generate a set of risk factors based on the user data and the enterprise data; a risk aggregator in communication with the plurality of fraud monitoring engines configured to: receive the set of risk factors, and transform the set of risk factors into risk indicators; and an authentication engine configured to: receive the risk indicators from the risk aggregator, and generate an authentication plan for a requested activity based on the risk indicators and the requested activity.

18 Claims, 12 Drawing Sheets

Related U.S. Application Data continuation-in-part of application No. 13/425,227, filed on Mar. 20, 2012, now Pat. No. 9,203,860.

(60) Provisional application No. 61/704,180, filed on Sep. 21, 2012, provisional application No. 61/814,636, filed on Apr. 22, 2013.

(56) References Cited

U.S. PATENT DOCUMENTS

| | | | | |
|---|---|---|---|---|
| 7,490,242 | B2* | 2/2009 | Torres | H04L 63/0815 380/281 |
| 7,908,645 | B2 | 3/2011 | Varghese et al. | |
| 8,239,677 | B2 | 8/2012 | Colson | |
| 8,296,564 | B2* | 10/2012 | Ureche | H04L 9/3247 713/168 |
| 8,584,219 | B1* | 11/2013 | Toole | G06F 21/60 726/25 |
| 2004/0006532 | A1* | 1/2004 | Lawrence | G06Q 30/02 705/38 |
| 2008/0155651 | A1 | 6/2008 | Wasmund | |
| 2009/0018904 | A1* | 1/2009 | Shipman | G06Q 30/0269 705/14.66 |
| 2009/0199264 | A1* | 8/2009 | Lang | G06F 21/31 726/1 |
| 2009/0254971 | A1* | 10/2009 | Herz | G06Q 10/10 726/1 |
| 2011/0004921 | A1* | 1/2011 | Homer | G06F 21/31 726/3 |
| 2011/0016534 | A1* | 1/2011 | Jakobsson | G06F 21/316 726/28 |
| 2011/0231911 | A1* | 9/2011 | White | G06F 21/32 726/7 |
| 2012/0030047 | A1 | 2/2012 | Fuentes et al. | |
| 2012/0054057 | A1* | 3/2012 | O'Connell et al. | G06F 21/36 705/26.1 |
| 2012/0054646 | A1* | 3/2012 | Hoomani | A63F 13/79 715/758 |
| 2012/0109802 | A1* | 5/2012 | Griffin | G06Q 40/00 705/35 |
| 2012/0137367 | A1* | 5/2012 | Dupont | G06F 21/00 726/25 |
| 2013/0123007 | A1* | 5/2013 | Williams | G06F 21/36 463/29 |
| 2013/0239191 | A1* | 9/2013 | Bostick | G06F 21/316 726/7 |

OTHER PUBLICATIONS

Albrecht, Conan C., "Strategic Fraud Detection: A Technology-Based Model", 2010, retrieved from http://www.business.umt.edu/Libraries/Seminar_Series/F04-Strategic_Fraud_Detection.sflb.ashx, 30 pages.

Albrecht, Conan C., "Conducting a Pro-Active Fraud Audit: A Case Study", Journal of Forensic Accounting, 2000, pp. 203-218, vol. II, R.T. Edwards, Inc.

Anderson, Debra,. "Detecting Unusual Program Behavior Using the Statistical Component of the Next-generation Intrusion Detection Expert System (NIDES)", SRI International Technical Report SRI-CSL-95-06, May 1995, 86 pages, Computer Science Laboratory.

Anderson, Debra,."Next Generation Intrusion Detection Expert System (NIDES)", Software User's Manual, Beta-Update Release, SRI International Technical Report SRI-CSL-95-0, Dec. 1, 1994, 316 pages, Computer Science Laboratory, Menlo Park, CA.

Barson, P. et al., "The Detection of Fraud in Mobile Phone Networks", Neural Network World, 1996, pp. 477-484, vol. 6, No. 4.

Barbacci, Mario, "Quality Attributes, CMU/SEI Technical Report", Dec. 1995, referenced online at http://www.sei.cmu.edu/pub/documents/95.reports/pdf/tr021.95.pdf, 68 pages.

Bell, Timothy B., "A Decision Aid for Assessing the Likelihood of Fraudulent Financial Reporting, Auditing: A Journal of Practice & Theory", Spring 2000, pp. 68-84, vol. 19, No. 1.

Berry, Michael, "Data Mining Techniques: Theory and Practice", 2009, ISBN 978-1-60764-366-1, SAS Institute, 35 Pages.

Boatsman, James R., "The Effects of Decision Consequences on Auditors' Reliance on Decision Aids in Audit Planning", Organizational Behavior and Human Decision Processes, Aug. 1997, pp. 211-247, vol. 71, No. 2, Academic Press.

Bolton, Richard J., "Statistical Fraud Detection: A Review, Statistical Science", 2002, pp. 235-255, vol. 17, No. 3.

Bonifacio Jr. J. M., "An Adaptive Intrusion Detection System Using Neural Networks", Proceedings of the 14th International Information Security Conference (IFIP/Sec'98, part of the 15th IFIP World Computer Congress), Aug. 31-Sep. 4, 1998, pp. 276-280, ISBN: 3-85403-116-.

Brause, R., "Neural Data Mining for Credit Card Fraud Detection, In Tools with Artificial Intelligence", Proceedings of the 11th IEEE International Conference, 1999, pp. 103-106, IEEE.

Breunig, Markus M., "LOF: Identifying Density-Based Local Outliers", Proceedings of the ACM SIGMOD International Conference on Management of Data, 2000, pp. 93-104, Dallas, TX.

Bridges, Susan M., "Fuzzy Data Mining and Genetic Algorithms Applied to Intrusion Detection", Proceedings of the National Information Systems Security Conference (NISSC), Oct. 16-19, 2000, pp. 13-31, Baltimore, MD.

Burge, Peter, "An Unsupervised Neural Network Approach to Profiling the Behavior of Mobile Phone Users for Use in Fraud Detection", Journal of Parallel and Distributed Computing, May 10, 2001, pp. 915-925, vol. 61, Academic Press.

Casella, George, "Statistical Inference—Second Edition", 2001, 2 pages, ISBN: 0-534-24312-6, Duxbury, Pacific Grove, CA.

Chou, Youn-Min, "Power Comparisons for a Hotelling's T2 Statistic", Communications in Statistics—Simulation and Computation, 1999, pp. 1031-1050, vol. 28, No. 4.

Cortes, Corinna, "Signature-Based Methods for Data Streams, Data Mining and Knowledge Discovery", 2001, pp. 167-182, vol. 5, Kluwer Academic Publishers, The Netherlands.

Cox, Kenneth C., "Visual Data Mining: Recognizing Telephone Calling Fraud, Data Mining and Knowledge Discovery", Apr. 17, 1997, pp. 225-231.

Dasgupta, Dipan'Kar, "An Immunity-Based Technique to Characterize Intrusions in Computer Networks", IEEE Transactions on Evolutionary Computation, Jun. 2002, pp. 281-291, vol. 6, No. 3, IEEE.

Debar, Herve et al., "A Neural Network Component for an Intrusion Detection System", IEEE Symposium on Research in Computer Security and Privacy, 1992, pp. 240-250, IEEE.

Decker, Paul, "Data's Mining Hidden Dangers", Banking Strategies, Mar./Apr. 1998, pp. 6-14.

Denning, Dorothy E., "An Intrusion-Detection Model", IEEE Transactions on Software Engineering, Feb. 1987, pp. 222-232, vol. SE-13, No. 2.

Detecting, Hackers, "Detecting Hackers (Analyzing Network Traffic) by Poisson Model Measure", retrieved from http://www.ensc.sfu.ca/people/grad/pwangf/IPSW_report.pdf, 9 pages.

Dickerson, John E., "Fuzzy Network Profiling for Intrusion Detection, Proceedings of the 19th International Conference of the North American Fuzzy Information Processing Society (NAFIPS)", 2000, pp. 301-306.

Dokas, Paul, "Data Mining for Network Intrusion Detection, Proceedings of the NSF Workshop on Next Generation Data Mining", Nov. 2002, pp. 21-30.

Estevez, Pablo A., "Subscription fraud prevention in telecommunications using fuzzy rules and neural networks", Expert Systems with Applications, 2006, pp. 337-344, vol. 31, Elsevier Ltd.

Estevez-Tapiador, Juan M., "Anomaly detection methods in wired networks: a survey and taxonomy", Computer Communications, 2004, pp. 1569-1584, vol. 27, Elsevier B.V.

Estevez-Tapiador, Juan M., "Detection of Web-based Attacks through Markovian Protocol Parsing", Proceedings of the 10th IEEE Symposium on Computers and Communications (ISCC 2005), 2005, pp. 457-462, IEEE.

Estevez-Tapiador, Juan M., "Stochastic Protocol Modeling for Anomaly-Based Network Intrusion Detection", Proceedings of the

(56) References Cited

OTHER PUBLICATIONS

2003 IEEE International Workshop on Information Assurance, Mar. 24, 2003, pp. 3-12, ISBN 0-7695-1886-9, IEEE Press.
Everitt, Brian S., "A Monte Carlo Investigation of the Robustness of Hotelling's One- and Two-Sample T2 Tests", Journal of the American Statistical Association, Mar. 1979, pp. 48-51, vol. 74, No. 365, American Statistical Association.
Ezawa, Kazuo J., "Learning Goal Oriented Bayesian Networks for Telecommunications Risk Management", Proceedings of the 13th International Conference on Machine Learning, 1996, pp. 139-147, Morgan Kaufmann.
Fox, Kevin L., "A Neural Network Approach Towards Intrusion Detection, 13th National Computer Security Conference", Oct. 1-4, 1990, pp. 125-134, Washington, D.C.
Frank, R.J., "Time Series Prediction and Neural Networks", Journal of Intelligent & Robotic Systems, 2001, pp. 91-103, vol. 31, No. 1.
Garcia-Teodoro, P., "Anomaly-based network intrusion detection: Techniques, systems and challenges", Computers & Security, 2009, pp. 18-28, vol. 28, Elsevier Ltd.
Green, Brian Patrick, "Assessing the Risk of Management Fraud Through Neural Network Technology, Auditing: A Journal of Practice & Theory, Spring 1997", pp. 14-28, vol. 16, No. 1.
Heckerman, David, "A Tutorial on Learning With Bayesian Networks, Technical Report MSR-TR-95-06", Nov. 1996, 58 pages, Microsoft Research, Redmond, WA.
Huang, Ling, "Adversarial Machine Learning", Proceedings of the 4th ACM Workshop on Security and Artificial Intelligence, Oct. 21, 2011, pp. 43-58, ACM, Chicago, IL.
Jiang, Cheng-Huang, "Keystroke Statistical Learning Model for Web Authentication", ASIACCS '07 Proceedings of the 2nd ACM Symposium on Information, Computer and Communications Security, Mar. 20-22, 2007, pp. 359-361, ACM, Singapore.
Khattree, Ravindra, "Multivariate Data Reduction and Discrimination with SAS© Software", 2000, SAS Institute, 49 pages.
Knapp, Carol A., "The effects of experience and explicit fraud risk assessment in detecting fraud with analytical procedures, Accounting, Organizations and Society", 2001, pp. 25-37, vol. 26, Elsevier Science Ltd.
Kruegel, Christopher, "Bayesian Event Classification for Intrusion Detection", Proceedings of the 19th Annual Computer Security Applications Conference, 2003, 10 pages.
Lazarevic, Aleksandar et al., "Intrusion Detection: A Survey, Managing Cyber Threats: Issues, Approaches, and Challenges, 2005", 60 pages, Springer Verlag.
Lee, Wenke, "Real Time Data Mining-based Intrusion Detection", DARPA Information Survivability Conference & Exposition II, Proceedings of DISCEX'01, 2001, pp. 89-100, vol. 1, IEEE.
Li, Wei, "Using Genetic Algorithm for Network Intrusion Detection", 2004, pp. 1-8, C.S.G. Department of Energy.
Liao, Yihua, "Using K-Nearest Neighbor Classifier for Intrusion Detection, Computers & Security", 2002, pp. 439-448, vol. 21.
Lin, Jerry W., "A fuzzy neural network for assessing the risk of fraudulent financial reporting", Managerial Auditing Journal, 2003, pp. 657-665, vol. 18, No. 8, MCB UP Limited.
Litan, Avivah, "Magic Quadrant for Web Fraud Detection", Apr. 19, 2011, 37 pages, Gartner, Inc. ID No. G00212116.
Lunt, Teresa F. et al., "A Real-Time Intrusion-Detection Expert System (IDES), SRI International Final Technical Report", Feb. 28, 1992, 166 pages, Menlo Park, CA.
MacKay, David J., "Information Theory, Inference, and Learning Algorithms", 2003, 640 pages, ISBN 0-521-64298-1, Cambridge University Press.
Maes, Sam, "Credit Card Fraud Detection Using Bayesian and Neural Networks", American Association of Neurological Surgeons, 1993, pp. 261-270.
Mahoney, Matthew V., "An Analysis of the 1999 DARPA/Lincoln Laboratory Evaluation Data for Network Anomaly Detection", Technical Report CS-2003-02, 2003, 20 pages, Florida Institute of Technology, Melbourne, FL.
Major, John A., "EFD: A Hybrid Knowledge/Statistical-Based System for the Detection of Fraud", International Journal of Intelligent Systems, 1992, pp. 687-703, vol. 26, John Wiley & Sons, Inc.
Mason, R. L., "Decomposition of T2 for Multivariate Control Chart Interpretation", Journal of Quality Technology, 1995, pp. 99-108, vol. 27, No. 2.
Mason, Robert L., "Assessment of Multivariate Process Control Techniques, Journal of Quality Technology", Apr. 1997, pp. 140-143, vol. 29, No. 2.
Mason, Robert L., "A Practical Approach for Interpreting Multivariate T2 Control Chart Signals", Journal of Quality Technology, Oct. 1997, pp. 396-406, vol. 29, No. 4.
Mason, Robert L., "Improving the Sensitivity of the T2 Statistic in Multivariate Process Control", Journal of Quality Technology, Apr. 1999, pp. 155-164, vol. 31, No. 2.
Murad, Uzi, "Unsupervised Profiling for Identifying Superimposed Fraud, Principles of Data Mining and Knowledge Discovery, Proceedings of Third European Conference", PKDD'99, 1999, pp. 251-261, Springer-Verlag, Berlin Heidelberg.
Nieschwietz, Robert J., "Empirical Research on External Auditors' Detection of Financial Statement Fraud", Journal of Accounting Literature, 2000, pp. 190-246, vol. 19.
Nigrini, Mark J., "Forensic Analytics: Methods and Techniques for Forensic Accounting Investigations", 2011, ISBN 978-0-470-89046-2, John Wiley & Sons, Inc. Hoboken, NJ, 14 pages.
Pak, Alexander, "Twitter as a Corpus for Sentiment Analysis and Opinion Mining", Proceedings of LREC, May 2010, 7 pages.
Palshikar, Girish Keshav, "The Hidden Truth, Intelligent Enterprise", May 28, 2002, pp. 46-51, vol. 5, No. 9.
Patcha, Animesh, "An Overview of Anomaly Detection Techniques: Existing Solutions and Latest Technological Trends, Computer Networks", 2007, pp. 3448-3470, vol. 51, No. 12, DOI: 10.1016/j.comnet.2007.02.001.
Phua, Clifton, "A Comprehensive Survey of Data Mining-based Fraud Detection Research", 2005, Clayton School of Information Technology, Monash University, Clayton, Victoria, Australia, 14 pages.
Porras, Phillip A., "EMERALD: Event Monitoring Enabling Responses to Anomalous Live Disturbances", 20th NIST-NCSC National Information Systems Security Conference, 1997, pp. 353-365, Baltimore, MD.
Portnoy, Leonid, "Intrusion Detection with Unlabeled Data Using Clustering", Proceedings of the ACM Workshop on Data Mining Applied to Security, 2001, 14 pages.
Ramadas, Manikantan, "Detecting Anomalous Network Traffic with Self-organizing Maps, Recent Advances in Intrusion Detection", Proceedings of 6th International Symposium, RAID 2003, 2003, pp. 36-54, Springer-Verlag, Berlin Heidelberg.
Sekar, R., "Specification-based Anomaly Detection: A New Approach for Detecting Network Intrusions", Proceedings of the Ninth ACM Conference on Computer and Communications Security (CCS '02), Nov. 18-22, 2002, pp. 265-274, ACM, Washington, D.C.
Sequeira, Karlton D., "Anomaly-Based Data Mining of Intrusions", Proceedings of the 8th ACM SIGKDD International Conference on Knowledge Discovery and Data Mining, 2002, pp. 386-395.
Shelton, Sandra W., "Auditing Firms' Fraud Risk Assessment Practices, Accounting Horizons", Mar. 2001, pp. 19-33, vol. 15, No. 1, American Accouting Association.
Smaha, Stephen E., "Haystack: An Intrusion Detection System, Aerospace Computer Security Applications Fourth Conference", 1988, pp. 37-44, IEEE.
Stolfo, Salvatore J., "Cost-based Modeling for Fraud and Intrusion Detection: Results from the JAM Project", DARPA Information Survivability Conference and Exposition, Proceedings of DISCEX'00, 2000, pp. 130-144, vol. 2, IEEE.
Tombini, Elvis, "A Serial Combination of Anomaly and Misuse IDSes Applied to HTTP Traffic", 20th Annual Computer Security Applications Conference, 2004, Tucson, AZ, 10 pages.
Viaene, Stijn, "A Comparison of State-of-the-Art Classification Techniques for Expert Automobile Insurance Claim Fraud Detection", The Journal of Risk and Insurance, 2002, pp. 373-421, vol. 69, No. 3.

(56) References Cited

OTHER PUBLICATIONS

Vigna, Giovanni, "The STAT Tool Suite, DARPA Information Survivability Conference and Exposition", Proceedings of DISCEX'00, 2000, pp. 46-55, vol. 2, IEEE.

Ye, Nong, "Multivariate Statistical Analysis of Audit Trails for Host-Based Intrusion Detection", IEEE Transactions on Computers, Jul. 2002, pp. 810-820, vol. 51, No. 7.

Ye, Nong, "Robustness of the Markov-Chain Model for Cyber-Attack Detection", IEEE Transactions on Reliability, Mar. 2004, pp. 116-123, vol. 53, No. 1, IEEE.

Yeung, Dit-Yan, "Host-Based Intrusion Detection Using Dynamic and Static Behavioral Models", Pattern Recognition, 2003, pp. 229-243, vol. 36, No. 1.

Zhang, Jiong, "A Hybrid Network Intrusion Detection Technique Using Random Forests", Proceedings of the First International Conference on Availability, Reliability and Security (ARES'06), 2006, pp. 262-269, IEEE.

\* cited by examiner

SCALABLE RISK-BASED AUTHENTICATION METHODS AND SYSTEMS

CROSS-REFERENCE TO RELATED APPLICATIONS

This application is a continuation of U.S. application Ser. No. 14/034,100, filed on Sep. 23, 2013, entitled "SCALABLE RISK-BASED AUTHENTICATION METHODS AND SYSTEMS", which is a continuation-in-part of U.S. application Ser. No. 13/425,227, filed on Mar. 20, 2012, entitled "DYNAMIC RISK ENGINE," issued as U.S. Pat. No. 9,203,860 on Dec. 1, 2015, and claims priority to U.S. Provisional Application Ser. No. 61/704,180, filed Sep. 21, 2012, and to U.S. Provisional Application Ser. No. 61/814,636, filed Apr. 22, 2013, all of which are incorporated herein by reference in their entireties for all purposes.

TECHNICAL FIELD

Various embodiments of the present disclosure generally relate to authentication. More specifically, various embodiments of the present disclosure relate to a risk-based authentication method and system.

BACKGROUND

Organizations strive to ensure secure and convenient user access to services or accounts. With the proliferation of identity theft and the growing emphasis on convenience, organizations are forced to find a balance between gathering enough identifying information and making the services or accounts accessible to users. Regulations and business rules may govern how much or the types of identifying information the user must provide depending upon the nature of the activity that is requested.

Existing systems often sacrifice security for convenience or sacrifice convenience for unnecessarily. For example, users may be required to provide a login, password, and answer a secret question simply to view current interest rates at an organization. Thus, although the user may be engaging in a low-risk activity, the user may be required to provide an excessive amount of information. Additionally, the risk level of an activity may vary with the user, depending on past behaviors or account preferences.

Further complicating the balance between security and convenience is that organizations have various channels in which users may interact with the organization. For example, users may perform activities related to an account at the organization over the phone, through an internet portal, by mobile phone application, or by face-to-face contact at a brick-and-mortar building. Thus, with the different means of interaction and access, organizations must provide various methods of verifying the user's identity.

SUMMARY

Methods and systems for scalable, risk-based authentication methods and systems are described. In some embodiments, a scalable, risk-based authentication system includes a plurality of fraud monitoring engines configured to analyze user data and organization data and generate a set of risk factors based on the user data and the enterprise data. The system may further include a risk aggregator in communication with the plurality of fraud monitoring engines configured to receive the set of risk factors and transform the set of risk factors into risk indicators. The system may further include an authentication engine configured to receive the risk indicators from the risk aggregator and generate an authentication plan for a requested activity based on the risk indicators and the requested activity.

The plurality of fraud monitoring engines may include a batch risk scorer configured to periodically generate an indication of an overall risk of a user account based on user patterns and previous alerts associated with the account, an information security monitoring engine configured to access alerts relating to enterprise information security, and a social network analyzer configured to analyze the user's social network to identify relationships indicating fraud.

In some embodiments, the plurality of fraud monitoring engines may include a behavior and events profiler configured to analyze complex relationships within the user data to detect user behavior patterns indicating potentially fraudulent behavior and generate an alert when the user behavior patterns indicate potentially fraudulent behavior. The behavior and events profiler may be further configured to compare user behavior to historical user behavior, determine whether the user behavior deviates from the historical user behavior above a threshold level, and generate an alert when the user behavior deviates above the threshold level.

The plurality of fraud monitoring engines may include one or more risk assessors configured to assess risk by determining whether a user device associated with the request is identified on a government published list of terrorist group, assessing an internet protocol address associated with the user device based on internet protocol reputation, and reviewing a status of the user device a status of the user device as registered with the organization.

To generate the authentication plan, the authentication engine may be configured to calculate an identity trust score based on the risk indicators and compare the identity trust score to an activity trust threshold for the requested activity. The authentication plan may further be based on user preferences and a channel used to request the activity. The risk aggregator may be further configured to update an authentication log with the authentication plan. In some embodiments, authentication logs can be updated by the authentication engine. The authentication plan may include one of: requesting authentication information from the user, allowing the user to proceed with the activity without receiving authentication information, or denying the request to proceed with the activity.

In some embodiments, the system further includes a set of risk-based authenticators configured to receive and verify authentication credentials from the user. When the authentication plan requests authentication information from the user, the authentication plan may identify at least one risk-based authenticator to receive and verify the authentication credentials based on a type of user device and channel. Transforming the risk factors into risk indicators may include weighting the risk factors based on the fraud monitoring engine the risk factor is received from.

The method for creating an authentication plan may include receiving, from a user device via a channel, an activity request from a user. In response to the request, risk factors indicative of behavior of the user, a social network of the user, the user device, and information security of the organization may be aggregated. The risk factors may be transformed into risk indicators, an identity trust score may be calculated based on the risk indicators, the identity trust score may be compared to an activity trust threshold for the requested activity, and an authentication plan may be generated based on the comparison and the channel used in requesting the activity.

The risk factors indicative of the behavior of the user may include alerts related to the behavior of the user. The alerts may be determined by comparing the behavior of the user with historical behavior of the user, determining whether the behavior of the user deviates from the historical behavior of the user above a threshold level, and generating an alert when the behavior of the user deviates above the threshold level. In some embodiments, the alerts may be determined by comparing the behavior of the user with behavior of a peer group of the user, determining whether the behavior of the user deviates from the behavior of a peer group of the user above a threshold level, and generating an alert when the behavior of the user deviates above the threshold level.

The risk factors further indicate a base risk score associated with the user, and the base risk score may be generated based on user activity across multiple channels and prior user behavior. In some embodiments, the user's base risk score may be periodically generated. The risk factors associated with the user device may include information relating to at least one of: internet protocol reputation, ground speed, device registration, device recognition, channel risk, inclusion or exclusion from government identified fraud lists or fraud consortium lists, a device identification risk, money laundering risk, or deposit risk assessment.

The authentication plan may be further based on user preferences and a device used to request the activity. The authentication plan may include one of: requesting authentication information from the user, allowing the user to proceed with the activity without receiving authentication information, or denying the request to proceed with the activity.

In other embodiments, a system includes means for receiving an activity request from a user, means for aggregating risk factors indicative of behavior of the user, a social network of the user, the user device, and information security of the organization, and means for generating an authentication plan based on the risk factors and a risk of the requested activity.

In some embodiments, the disclosure describes a method that includes passively authenticating a user based on information gathered from a user operated device, where the user operated device is used as part of a request for an activity. The information may be used to assess risk, and the method may further include creating an identity trust score for comparison to an activity risk score to determine if additional authentication is needed. The method may further include creating an authentication plan using information gathered about the channel, the information gathered from the user operated device, information related to historical interaction or behavior of the user, and security and risk intelligence of the organization.

In other embodiments, a method includes creating a unique authentication plan for a session with a user based on an intrusiveness of the authentication methods available, user preferences, device capabilities, and a difference between an identity trust score and an activity score of the requested activity, where the unique authentication plan includes one or more authentication options.

In some embodiments, information is aggregated and risk is assessed across multiple channels over time to determine risk factors or a trust based on passive interactions in real-time. Passive interactions may include interactions with the user or user device in which the user is not required to actively provide information to an organization. Fraud and security data may influence the trust of the user, the information or risk factors being received, or an activity being requested by the user. The described methods and systems may constantly check and update risk based on activities, or lack thereof, current channel information, active or passive authentication feeds, based on current or previous activities on one or more channels in real time.

While multiple embodiments are disclosed, still other embodiments of the present disclosure will become apparent to those skilled in the art from the following detailed description, which shows and describes illustrative embodiments of the present disclosure. As will be realized, embodiments of the disclosure are capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which.

Figure 1:
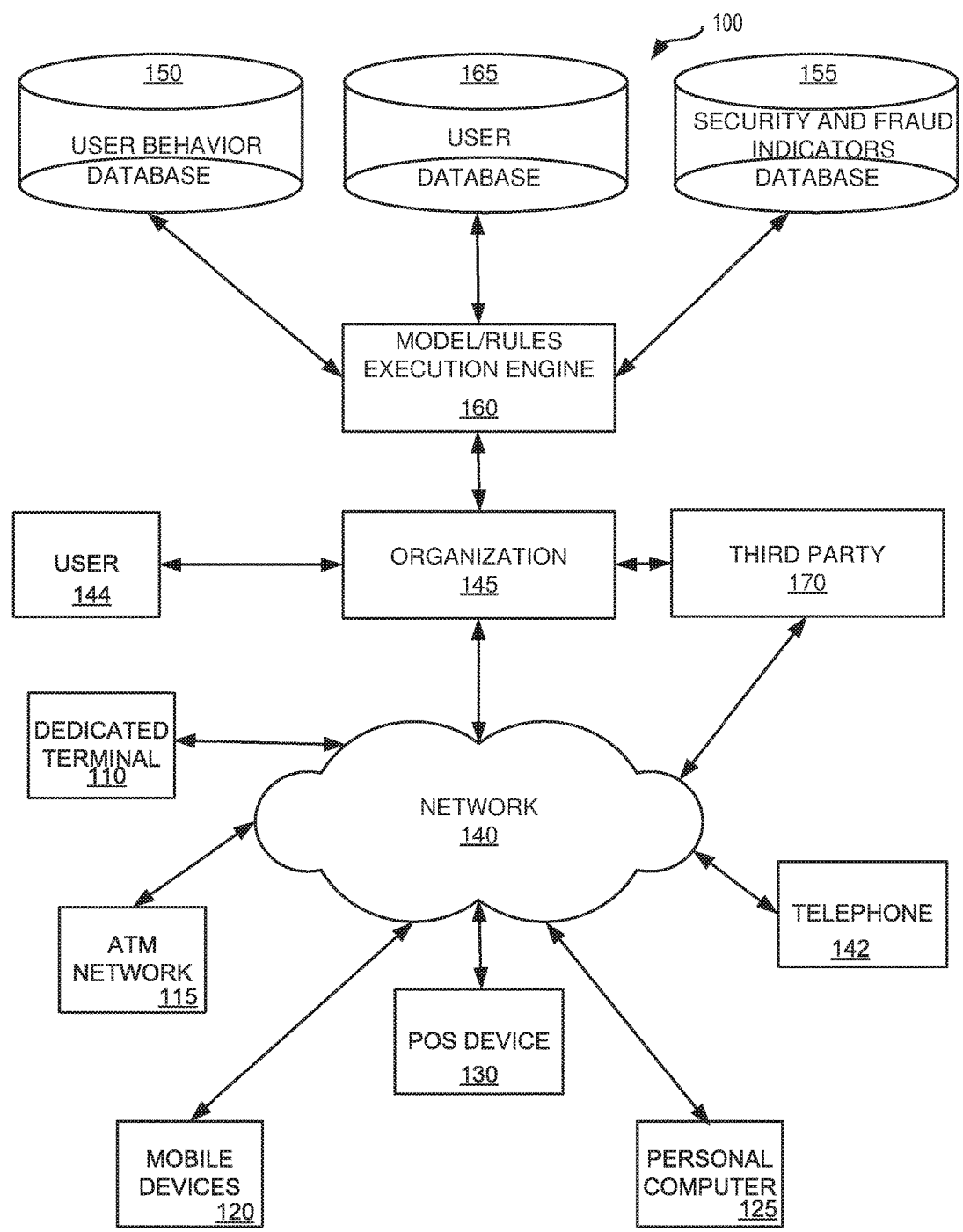
FIG. 1 illustrates an example of an operating environment in which some embodiments of the present disclosure may be utilized.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Various embodiments of the present disclosure generally relate to identity authentication. More specifically, various embodiments of the present disclosure relate to a dynamic risk engine for determining when and whether sufficient identifying information is available to permit a user to engage in a restricted activity in addition to an authentication engine that is able to initiate channel-appropriate authentication challenges, in order to increase the identity trust score of a particular session. Existing and future authentication methods or mechanisms may be added, enabled, disabled, or removed in a manner that does not disrupt or affect the integrity of the dynamic risk engine (i.e., authentication mechanisms are "hot-pluggable."). A generic application programming interface may connect the existing and future authentication mechanisms.

Organizations allow users to access services and engage in activities through various channels. Examples of channels include modes of communication (e.g., a communications network) for exchanging data between devices. Devices may include, but are not limited to, computing devices such as tablets, personal computers, smartphones, point of sale devices, ATMs, connected smart devices such as refrigerators, watches, and laptops; telephones such as landline telephones or mobile phones; and face-to-face contact such as between a user and an employee of the organization. Channels may also include software and firmware associated with the devices and communications devices such as web portals, applications, networks, mobile applications, and instant messaging systems. Channels may also include hardware associated with the computing devices and telephones, such as the network hardware, credit card scanners, and retinal scanners.

Channels allow the user to engage in activities with an organization during a session. For example, a user may use a web portal or mobile application (i.e., a channel) to engage in activities, such as viewing an account, trading funds, purchasing insurance, submitting or processing a negotiable instrument. Each channel may accept unique verifying information, and the verifying information may change depending upon the activity requested. Thus, users may access such accounts and perform various activities relating to services (e.g., banking services, automobile insurance, etc.) via the channels when sufficient verifying information has been acquired.

For each activity request, the user is re-authenticated using the dynamic risk engine. The user may be re-authenticated to a certain level, qualifying the user to do many activities without providing additional authentication. However, the system may lose trust in the user if the user behaves out of a normal pattern, thus requiring the user to provide additional authentication. Constant collection of passive or active authentication information and risk factors constantly alters how much the system trusts that the user is who the user claims to be. The system allows for a user to be authenticated using any channel at any time.

Users may interact with the organization via channels during one or more sessions. A session may be an interactive exchange defined by a beginning interaction, such as logging into an account, and an ending interaction such as logging out. In some embodiments, sessions between the user and the organization may be contiguous time periods of interaction or related interactions that occur over a series of distinct time periods. In another example, a session may be a phone call, which begins with a user calling the organization and ends when the call is terminated. One or more activities may take place during a single session. For example, a mobile application account session may begin with the user logging in using a username/password, completing several activities, such as checking an account balance, ordering a new credit card, and transferring funds, and ending the session by logging out. A session may take place through a single channel. In some embodiments, a session may include interactions over multiple channels by porting a session from one channel, such as a mobile application, onto a second channel, such as a voice and data call.

In order to engage in an activity during a session, the user provides a level of identifying information, passively and/or actively. Passive authentication information (i.e., information provided passively) may include information that is accessed, collected, or otherwise received by the organization without requiring any action by the user. Examples of passive authentication information may include the existence or version of a secure browsing solution, a device fingerprint, voice recognition, or behavior patterns. Active authentication information (i.e., authentication information provided actively) may include information that is actively provided by the user. Examples of active authentication information may include a password, PIN, code, and answer to a security question. In some embodiments, the system collects as much passive authentication information as possible before requesting active authentication information in an effort to make the user's contact with the organization more convenient for the user while still identifying potentially fraudulent activity.

The level of identifying information required is determined by an activity trust threshold. Various rules and factors such as industry standards and fraud information on a particular activity are used in determining the activity trust threshold. The user's identity must be verified according to the activity trust threshold to engage in the activity.

An identity trust score can be established for the user. During each user contact, identity characteristics and attributes about the user and his/her device will be collected. The characteristics and attributes collected during contact with a user are stored for future comparison and data modeling. Characteristics or attributes of the user will be assigned a score or level whether individually or grouped characteristics or attributes. When a user attempts to conduct an activity, the identity characteristics or attributes associated with the communication are compared to the known characteristics or attributes stored about the user. All the matched characteristics or attributes scores or levels are combined to generate the identity trust score. Incorrect responses, uncharacteristic behavior, or intelligence about specific attributes that apply to a user will either increase the activity trust threshold or decrease the user's identity trust score.

The identity trust score represents a measure of the identifying information that is acquired or measured by the fraud prevention system. The identity trust score may be determined by various rules. Identifying information may be information known to the user (e.g., password), a physical attribute of the user (e.g., biometric data), or information identifying a device, wherein the device is associated with the user (e.g., device fingerprint, phone number). Examples of identifying information may include a machine identification, username, password, social security number, token, personal identification number, grid card code, biometric data, geolocation, or historic user behavior for example.

Various channels allow for various types of identifying information to be acquired. The measure may be numbers or levels, but in either case, the measure corresponds to the activity trust threshold such that the activity trust threshold and the identity trust score can be compared in a meaningful way. In various embodiments, the identity trust score must meet or exceed the activity trust threshold in order for the user to proceed with the activity. If the initial identifying information does not provide an identity trust score that meets or exceeds the activity trust threshold, the user may actively provide (e.g., a password)—or the system may acquire passively (e.g., a device fingerprint)—additional identifying information to raise the identity trust score to meet or exceed the activity trust threshold. There may be an initial learning period on each channel such that initially, a user may be required to use predefined authentication methods.

For example, a user may request to view an account (the activity) via an internet portal (the channel). The risk of the activity and the information collected in connection with the channel are used to determine an activity trust threshold equal to 50, for example. The machine used in connection with the channel is identified as registered, providing an identity trust score equal to 30. Thus, in this example, additional identifying information is necessary for the user to view the account. Identifying information such as a correct username and password may provide an identity trust score of 65, and, thus, if provided, the user will be permitted to view the account. If the user cannot provide this information, the user may provide other identifying information and still view the account if the other identifying information satisfies the activity trust threshold.

In some examples, the user's behavior impacts the identity trust score. For example, if the user exhibits the same behaviors as the user has done in the past, the identity trust score may be recalculated to reflect this identifying information. In another example, a user wishing to engage in the activity of transferring money from one bank account to another bank account via a mobile application may satisfy the activity trust threshold simply by typing a personal identification number into the application on a certain device. For each activity requested, the user is re-authenticated using the process. In some embodiments, the user is allowed to perform basic activities based only on passively collected authentication information.

Thus the disclosure describes a dynamic risk engine that determines whether a user will be allowed to engage in an activity based on an activity trust threshold determined for that user and that activity, and compares the activity trust threshold to an identity trust score calculated for the user. The identity trust score may be dynamically generated as identifying information becomes available and may increase or decrease depending on the identifying information. Therefore, this disclosure describes a dynamic risk engine that facilitates equitable comparisons of trust across multiple users, computing devices, and/or channels.

Further embodiments describe a scalable, risk-based authentication system. The risk-based authentication system may include a number of fraud monitoring engines that provide risk factors to a risk aggregator. For example, some fraud monitoring engines may profile a user's behavior to detect user activity outside of a predictable pattern or normal variation thereof. Other fraud monitoring engines may assess risk based on a user device. User devices include devices operated by a user (user operated devices), such as an ATM, public computer, mobile phone, etc. Fewer or additional fraud monitoring engines may be included in the system, depending on the needs of the organization and future fraud prevention techniques. Some or all of the fraud monitoring engines may be used at one time. The risk aggregator may weigh the risk factors differently depending on which fraud monitoring engine reported the risk factor, particularly (but not limited to) when the risk factors do not yield similar results. The fraud monitoring engines, also referred to as risk assessors, can be hot-pluggable allowing, for enabling and disabling as needed or desired.

The risk aggregator may transform the risk factors into risk indicators (e.g., scorable elements). This may be done by taking the raw data, manipulating the data (e.g., scoring based on rulesets according to risk). Risk indicators may be communicated to an authentication engine to determine an authentication plan. The authentication engine may determine an identity trust score for the user, which may then be compared to the activity trust threshold to determine if the user should be required to submit additional identifying information prior to proceeding.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

Having described embodiments of the present disclosure generally, attention is now directed to FIG. 1, which illustrates an example of an operating environment 100 in which some embodiments of the present disclosure may be utilized.

The embodiments of the present disclosure illustrated in FIG. 1 allow user interactions with organization 145 through various points of interaction such as, but not limited to, dedicated terminals 110 (e.g., public terminal or kiosk), ATM networks 115 (e.g., interbank ATM network and intrabank ATM networks), mobile devices 120 (e.g., mobile phone), personal computers 125, point of sale (POS) devices 130, face-to-face contact represented by user 144, or by a landline telephone represented by telephone 142. These points of interaction can include mechanisms for engaging in activities with organization 145. For example, a user may engage in activities such as viewing an account, trading funds, purchasing insurance, submitting or processing a negotiable instrument and may run one or more applications or clients that allow a user to interact with the network. Such applications may provide access to the organization 145 processing systems and interfaces. Thus, the points of interaction allow the user to engage in an activity via a channel. The channels may include face-to-face contact as shown by user 144, voice communication such as through telephone 142, internet portal or instant messaging such as through personal computer 125, or mobile application such as through mobile device 120.

Dedicated terminals 110 such as public terminals/kiosks may be computers available to the public and/or specially designed kiosks that interact with network 140. ATM networks 115 can be any set of ATMs in an interbank ATM network and/or intrabank ATM network. Mobile devices 120 may be cellular phones, smart phones (a smart phone being a cellular phone that has capabilities and features such as, but not limited to, internet access, a full keyboard, email access, Wi-Fi connection capabilities, BLUETOOTH connectivity, SMS, or any other functionality of a computer), tablet computers (a portable computer having a touch interface), netbooks, laptops possibly with a wireless connection (such as an 802.11a/b/g connection or mobile broadband connection, such as via a 3G or 4G wireless network). Personal computers 125 may be any computer (e.g., desktop computers, laptop computers, netbooks, tablet computers, Internet-enabled television devices, etc.) connected to network 140. Dedicated terminals 110, mobile devices 120, and personal computer 125 may be capable of exchanging communication in the form of voice and/or video.

POS devices 130 can be any device used as a checkout or payment receiving mechanism for a merchant or service provider such as a hospital, ambulance company, doctor, automobile repair shop, pharmacy, clothing store, and others. For example, POS device 130 can be a terminal located at a merchant, a computer-based interface such as a webpage or custom application, a telephone payment system, and others.

Network 140 may include a banking network. In accordance with embodiments of the present disclosure, network 140 can use a variety of interaction methods, protocols, and systems. For example, network 140 can use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used.

As illustrated in FIG. 1, users may interact with organization 145 via different channels using various points of interaction. Organization 145 may be a membership organization, and the users may be members or potential members of the membership organization. Organization 145 may be a financial institution, or any kind of entity providing any type of service. Organization 145 may be communicably coupled with third party 170. Third party 170 is any organization or source of information external to organization 145 that provides organization 145 with information that may be used in determining an activity trust threshold. For example, information provided by third party 170 may include the identity of IP addresses known to be fraudulent, known mal-ware on systems or networks, etc.

Third party 170 may also provide information that is specific to a user. For example, a third party may provide information that a credit card belonging to the user has recently been compromised. The information may be stored in security and fraud indicator database 155. Organization 145 may include various computing systems, model/rules execution engine 160, user behavior database 150, security and fraud indicator database 155, and user database 165.

Model/rules execution engine 160 uses information from various databases and third party 170, including information related to the risk of the activity and information acquired in connection with the channel, applies rules relating to the risk of the activity and the information in connection with the channel to determine an activity trust threshold, acquires and uses identifying information to establish an identity trust score for the user, and determines whether the user is permitted to engage in a particular activity. Additionally, the model/rules execution engine 160 may dynamically generates the identity trust score as information becomes available. The identity trust score may be upgraded or degraded depending upon the identifying information. Model/rules execution engine 160 could be a rules execution engine, a model execution engine or a combination of the two.

Model/rules execution engine 160 can be communicably coupled to one or more databases such as user behavior database 150, security and fraud indicator database 155, and user database 165, and may receive information from third party 170. These databases and external sources include information that can be utilized by model/rules execution engine 160. Model/rules execution engine 160 may be communicatively coupled to other systems.

User behavior database 150 may include transaction information relating to past transactions the user has engaged in, such as the time of day transactions were made, the amount and destination of the transfer, the channel and/or point of interaction used, activities and times associated with those activities (time spent making the transaction), etc. User behavior database 150 may also include information relating to the user's account, such as how many logon attempts have been made, the number of failed logon attempts, the number of successful logon attempts, where the attempts originated from, when and where and from what machine the user has changed passwords, registered devices, and so on. User behavior database 150 may also include information relating to the user's common purchasing habits.

User database 165 may store information about users, including employment information, account balances, credit ratings, home ownership information, annual salary, length of membership, and/or other information. User database 165 may store security preferences or instructions that the user has expressed, such as if a requested transaction is over $100 to ask the requestor for a one time password sent to an email address.

Security and fraud indicator database 155 may store information relating to information security events, physical security events, cyber intelligence, IP addresses that organization 145 has previously received attacks from, addresses of known fraudsters, known mal-ware on systems or networks, risk scores associated with IP addresses or networks, etc. As used in this disclosure, "information security" refers to the security and risk intelligence of an organization. This information may also be provided or supplemented by third party 170. These events may be related to a particular user, or the events may relate to all users. Thus, this information may impact the activity trust threshold required for an activity globally, or the information may relate to one particular user. In some embodiments, these databases may be integrated into one database.

A computer system associated with the organization or authorized third parties may be able to access these databases for account information, user information, security information, and other stored information. In addition, third parties may provide information relating to the user such as the location of the user, a credit score of the user, or any other security information. Model/rules execution engine 160 may include many sub-engines that combine scores ultimately.

Figure 2:
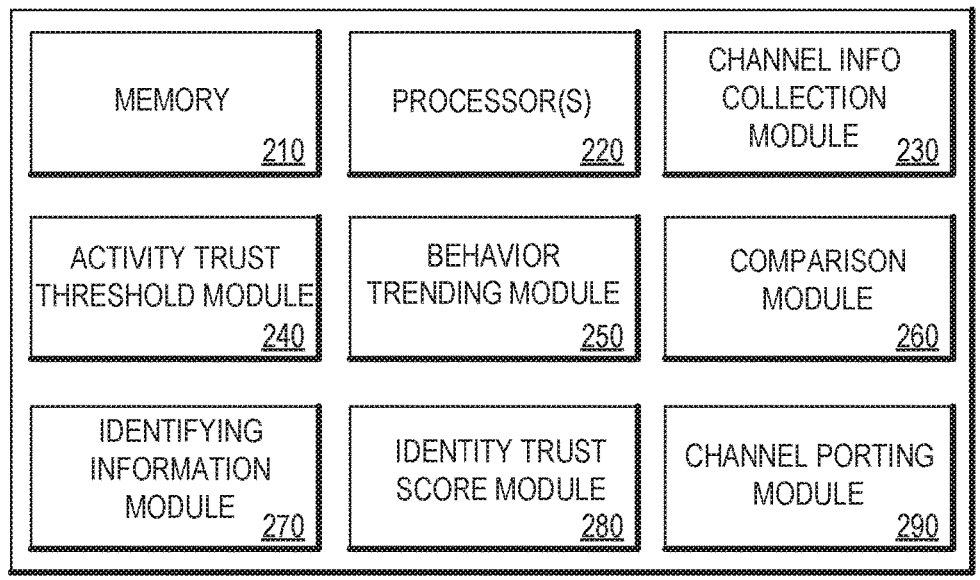
FIG. 2 is a block diagram illustrating components that can be included in an identity authentication system in accordance with various embodiments of the present disclosure.

FIG. 2 is a block diagram illustrating exemplary components that can be included in an identity authentication system in accordance with various embodiments of the present disclosure. According to the embodiments shown in FIG. 2, the authentication system 200 can include memory 210, one or more processors 220, channel information collection module 230, activity trust threshold module 240, behavior trending module 250, comparison module 260, identifying information module 270, identity trust score module 280, and channel porting module 290. Other embodiments of the present disclosure may include some, all, or none of these modules and components along with other modules, applications, and/or components. Still yet, some embodiments may incorporate two or more of these modules into a single module and/or associate a portion of the functionality of one or more of these modules with a different module.

For example, in one embodiment, the functionality associated with channel information collection module 230 and identifying information module 270 can be incorporated into a single information collection and analysis module. As another example, in one embodiment, the identity trust score module 280 can be separated into a channel rules module for determining the channel-appropriate authentication rules, a security preferences module for determining the security preferences of the user, and an identity trust score updating module to continuously update the identity trust score as identifying information becomes available. Moreover, the output of these modules can be a channel-specific identity trust score that is updated constantly to authenticate the user according to security preferences. In some embodiments, the identity trust score is a multiple channel identity score updated constantly or periodically.

Memory 210 can be any device, mechanism, or populated data structure used for storing information. In accordance with some embodiments of the present disclosure, memory 210 can encompass any type of, but is not limited to, volatile memory, nonvolatile memory, and dynamic memory. For example, memory 210 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 210 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 210.

Memory 210 may be used to store instructions for running one or more applications or modules on processor(s) 220. For example, memory 210 could be used in one or more embodiments to house all or some of the instructions needed to execute the functionality of channel information collection module 230, behavior trending module 250, activity trust threshold module 240, comparison module 260, identifying information module 270, identity trust score module 280, and channel porting module 290.

Channel information collection module 230 is configured to engage in an initial contact with a user via a channel, and in doing so, it is further configured to receive, collect, and/or acquire information in connection with the channel, including location information (e.g., region, city, ISO country code, global positioning system information), machine or device identification, internet protocol address, the type of network (e.g., cable, dial-up, digital subscriber line, fiberoptic internet, mobile), language, and internet service provider. For example, the channel information collection module 230 may detect that the user is using a particular device that is registered with the organization. Some information acquired by the channel information collection module may be used in determining an activity trust threshold. For example, if a user is determined to be located in France, more identifying information may be required from the user as compared to a user determined to be located in the United States, even if the users are requesting to engage in the same activity.

Behavior trending module 250 compiles, mines, and/or models data related to historic user behavior. The historic user information is compared to the user's activity to provide additional identifying information. The identifying information may be used in determining an identity trust score for the user, and may be collected continuously during the session. For example, behavior trending module 250 may compile information related to logon attempts for the user including the number of successful and unsuccessful logon attempts, the number of connection events, the time period the attempts were made in, historical user channel information, the type of activities the user has requested, the time of day the user requests the activity or similar activities, the nature of the activities, etc. This identifying information is used in determining an identity trust score for the user requesting to participate in the activity. The user's identity trust score may dynamically change during a session depending on the user's activities as analyzed by the behavior trending module 250. For example, a user's identity trust score may initially be high enough to view an account balance or check charges on a debit card. However, to transfer money from one account to another account may require additional authentication to increase the user's identity trust score.

The user's identity trust score may increase if the user follows the same behavior on the website as the user typically does. For example, assume the user typically logs in and spends five to ten seconds on the summary page, followed by checking credit card charges for a few minutes, and then reviews several stock prices. If the user does some or all of the actions prior to or while requesting the transfer, the identity trust score would have increased since the user's initial logon. Thus, a user requesting to engage in a generally high risk activity may engage in the activity if the user has a history of engaging in the activity in a manner consistent with past behavior. This use of past user behavior may also decrease the identity trust score. For example, if the user's browsing behavior is incongruent with past browsing behavior, then the user's identity trust score may be lowered. Thus, the behavior trending module may be used in determining the user's identity trust score based on any number of factors including the number of logon attempts and historic user behavior.

Activity trust threshold module 240 is configured to determine an activity trust threshold for the activity. The activity trust threshold sets a minimum identity trust score required for a user to engage in the activity. Activity trust threshold module 240 accesses information collected and/or processed by channel information collection module 230 and behavior trending module 250, and other general information relating to the risk of the activity. In some embodiments, the activity trust threshold module 240 may use information provided by third parties including information that is specific to the user and/or information that may be applied globally. The information is used in determining the activity trust threshold. In some embodiments, determining the activity trust threshold includes generating the activity trust threshold based on rules relating to a risk of the activity and information collected in connection with the channel. A risk of the activity may be determined by the type of the activity, perceived system threats, regulations, transaction amount, time of the activity, destination of funds, and/or any other factors. Other factors or information in connection with the channel may include channel risk, ground speed (miles per hour to travel between the logon location and the previous logon location), the number of days since the last address change, number of alerts on the user, etc.

In some embodiments, the activity trust threshold module 240 may include a scoring system in which the value of each factor is given a score. In some embodiments, each factor is weighted according to its significance. The scores may be combined in any desired manner to determine an activity trust threshold. Any number of factors may be used to determine an activity trust threshold for any user, engaging in any activity via any channel, providing a flexible system. Additionally, in some embodiments, various factors described as used to determine the activity trust threshold may be used instead in determining the identity trust score, and vice versa.

Identifying information module 270 is configured to acquire identifying information associated with the user. Identifying information collected by the identifying information module 270, in combination with information supplied by the behavior trending module 250 is used in the identity trust score module 280 to determine an identity trust score.

Examples of identifying information include a password, username, biometric data, device identification, phone number, token, one-time password, or grid card. In some embodiments, identifying information module 270 collects identifying information according to the channel. For example, identifying information, if the channel is an internet portal, may include device identification, username and password personal identification number, and a token, whereas identifying information if the channel is a voice communication may include ANI, voice biometrics, and a token. A set of channel rules may determine the order that the information is collected, if at all. Some identifying information is collected automatically and continuously. For example, if the channel is voice communications, the identifying information module 270 may analyze the voice as the user speaks, thus providing identifying information to the identity trust score module 280. In some embodiments, the identifying information module 270 requests the user to provide additional identifying information. The request may be made if the identifying information is not satisfactory for the user to engage in the activity because the activity trust threshold requires more identifying information, or the request for additional identification may be made consistent with security preferences expressed by the user. For example, the user may have requested that any transaction over a certain amount requires the user to enter a PIN, or the user may have indicated a rule disallowing wire transfers or transfers to certain countries.

The identity trust score module 280 is configured to determine an identity trust score for the user based on information acquired by the identifying information module 270 and the behavior trending module 250. In some embodiments, the identity trust score module 280 performs channel-appropriate authentication by determining an identity trust score for the user based on the identifying information acquired from the identifying information module 270. Thus, the identity trust score may be a number or a level of information that corresponds with the activity trust threshold. If the activity trust threshold level is low (indicating that the risk is low or trust is high), less identifying information is necessary for the user to engage in the activity.

In some embodiments, each channel is governed by channel-specific rules. For example, on a voice telephone call, determining only the phone number may result in an insufficient or low identity trust score. However, if the user's voice is authenticated, the user will then automatically be authenticated to a much higher level, resulting in a higher identity trust score. In another example, a user attempting to fill out a loan application online scores a certain identity trust score simply by using a machine that is recognized. However, the user will score a much higher identity trust score if the user provides a username/password combination. Thus, some factors collected in connection with the channel as well as historical user behavior are integrated together by some weighted formula to dynamically generate an identity trust score.

Once the identity trust score is determined by the identity trust score module 280, the comparison module 260 compares the identity trust score with the activity trust threshold. If the comparison module determines that the identity trust score meets or exceeds the activity trust threshold, then the user will be permitted to engage in the activity. If the comparison module 260 determines that the identity trust score is lower than the activity trust threshold, then the user is either rejected from engaging in the activity or the user may be asked to provide additional identifying information to raise the identity trust score. If additional identifying information becomes available (e.g., the identifying information module requests more information or collects it automatically), the identity trust score is re-calculated with the new information and the revised identity trust score is compared with the activity trust threshold.

In some embodiments the identity trust score can be dynamically generated, sometimes by information provided from the behavior trending module, and, thus, the identity trust score is being constantly updated without additional requests from the user. In some embodiments, the user has exhausted all methods of authentication in that channel but has been unsuccessful in raising the identity trust score to the necessary activity trust threshold level. In such a case, the user may be rejected from engaging in the activity. In some examples, the activity trust threshold is determined to be too high and the user will be rejected without being asked for additional identifying information. For example, if the information collection module determines that the user is accessing an account from certain countries or regions, the request may simply be rejected because the activity trust threshold determined by the activity trust threshold module is simply unattainable. When an authentication method is completed (e.g., the user successfully logs in), the identity trust threshold may be increased.

The following is an example of how the dynamic risk engine may be used. A user wishes to engage in wiring money from an account in the United States to an account in China. The channel is an internet portal. Before the user has logged in or requested to engage in the wire transfer, the channel information collection module has collected some information such as location, internet service providers, network, and provided the information to the activity trust threshold module. The information collection module has determined that the user is located in China and that the internet service provider is AOL. Each of the values of these factors is given a predetermined score perhaps determined by industry standards. For example, a location of China may be given a certain score indicating that the trust level for this user is not high. The internet service provider may be one that is trusted, indicating a high level of trust.

However, the location information may be more significant in determining the activity trust threshold and may therefore have a greater impact on the overall activity trust threshold. Some factors in connection with the channel as well as the factors related to a risk of the activity are then integrated together by some weighted formula to determine an activity trust threshold for this user to engage in this activity. As illustrated in the example, the activity trust threshold is determined by various rules related to the risk of the activity and information in connection with the channel. Next, an identity trust score is determined. As mentioned, information in connection with the channel including the device identification has been collected. Next an initial identity trust score is determined. If the device has been registered in the system or the user has used the recognized device in the past, this information is taken into consideration in determining the initial trust score. Additional information used in determining the initial identity trust score could be a correct username and password supplied by the user. In some embodiments, a batch risk score (described below) may be included in determining the initial identity trust score.

An initial identity trust score is determined based on this identifying information. The behavior trending module supplies information that the logon attempt was successful on the first attempt, that the user is currently deployed to China, and that every Saturday, at a similar time, the user wires money from an account in the United States to an account in China, consistent with the user's actions today. Additionally, when the user logged in, the user checked a credit card balance prior to request the transfer, as the user typically does. The identity trust score is raised because the user is acting in accordance with historical user behavior. As described, the identity trust score is then compared to the activity trust threshold to determine whether additional identifying information is necessary. If so, the identity trust score is regenerated as the information becomes available.

In some embodiments, authentication system 200 includes a channel porting module 290 configured to transfer a user on one channel to a second channel that is different from the first channel, during a session. The channel porting module 290 allows the session to seamlessly be transferred to a different channel. Using the channel porting module 290, an identity trust score and activity trust threshold in connection with the second channel may be determined and compared. If enough identifying information is available (the identity trust score meets or exceeds the activity trust threshold), the session will be continued on the second channel. The information collected in connection with the first channel may be used to authenticate the user on a second channel. In some embodiments, the user may not be required to provide any additional identifying information for the session to be continued on the second channel. The session may be transferred, and the user may be authenticated, using systems and methods described in U.S. patent application Ser. No. 14/019,669, filed Sep. 6, 2013, entitled METHODS AND SYSTEMS FOR MULTIPLE CHANNEL AUTHENTICATION, the contents of which are herein incorporated by reference in its entirety for all purposes.

Figure 3:
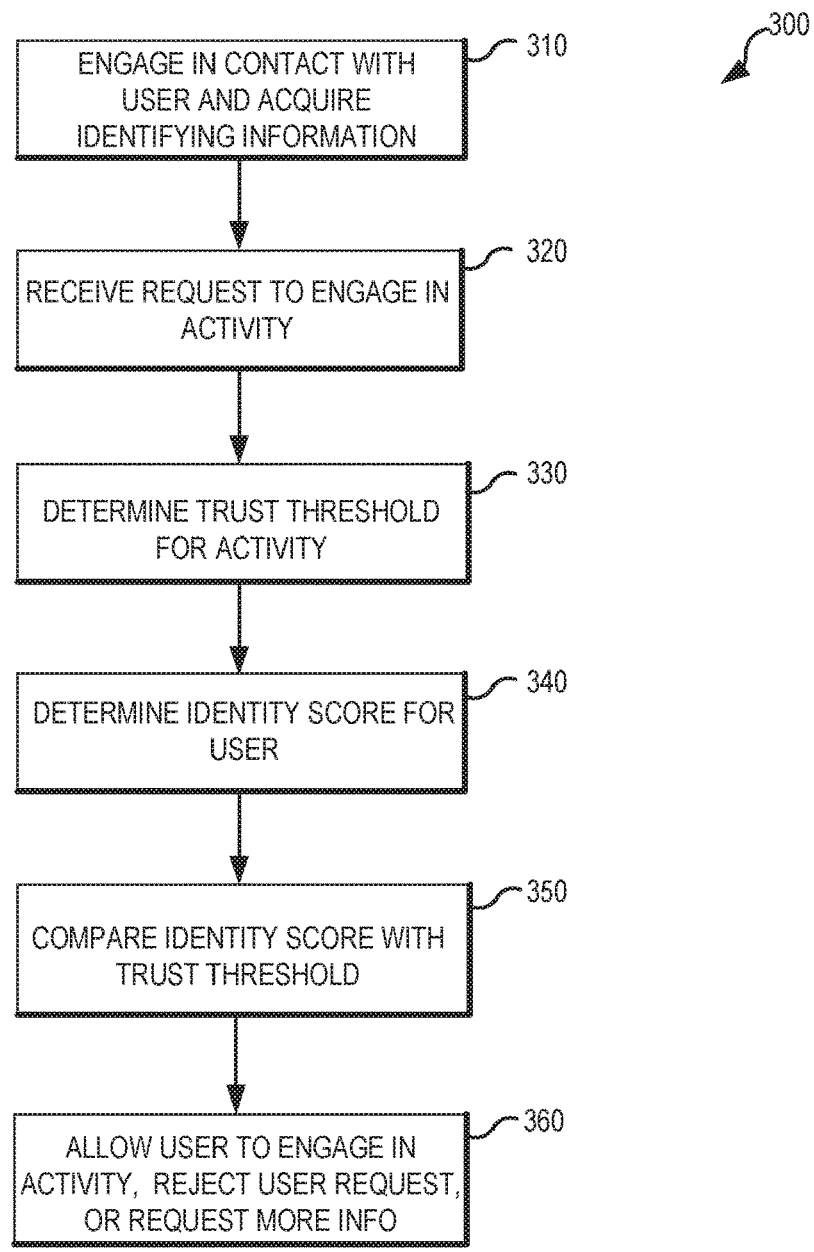
FIG. 3 is a flow chart illustrating a set of operations for determining whether to allow a user to engage in a restricted activity in accordance with some embodiments of the present disclosure.

FIG. 3 is a flowchart illustrating a set of exemplary operations for determining whether to allow a user to engage in a restricted activity in accordance with some embodiments of the present disclosure. In block 310, a user engages in a contact via a channel. Also in this block, identifying information relating to the user is acquired. The channel may be a mobile application, an internet portal, voice communication, instant messaging system, or an in-person visit to a brick-and-mortar building. A number of devices or no device may be used in making the contact. The user may or may not have an account with the organization. In an example, a contact may include a visit to a website, and identifying information may include device identification.

In block 320, a request is received for the user to engage in an activity. The activity may be to view a particular webpage of the organization, transfer funds, fill out a mortgage application, browse interest rates, compare insurance rates, purchase insurance, or deposit a check, for example.

In block 330, an activity trust threshold is determined for the requested activity. In some embodiments, determining the activity trust threshold includes generating the activity trust threshold based on rules relating to a risk of the activity and information collected in connection with the channel. Some or all of the information may be assigned scores and totaled to generate an activity trust threshold. In some embodiments, the information is weighted depending on the significance of the information. As described above, the activity trust threshold sets a minimum identity trust score (level of identifying information) that must be acquired for the user to engage in the activity.

In block 340, an identity trust score is determined for the user. The identity trust score is determined based on the identifying information acquired. In some embodiments, the identifying information is based at least in part on information in connection with the channel. In some embodiments, the identifying information is channel-specific. Identifying information may include information such as a username, a password, biometric data, a device identification, an automatic number identification, a token, a onetime password, or a grid card code, for example. Identifying information may also include information collected or compiled in connection with the user's historic behavior. For example, if the user acts in accordance with typical behaviors, the user's identity trust score may be increased. Or, if the user acts inconsistently with past behaviors, the user's identity trust score may be decreased from the initial score.

In block 350, the identity trust score is compared with the activity trust threshold. Next in block 360, based on the comparison, the user is allowed to engage in the activity, the user's request to engage in the activity is rejected, or additional identifying information is requested from the user or collected automatically.

Figure 4:
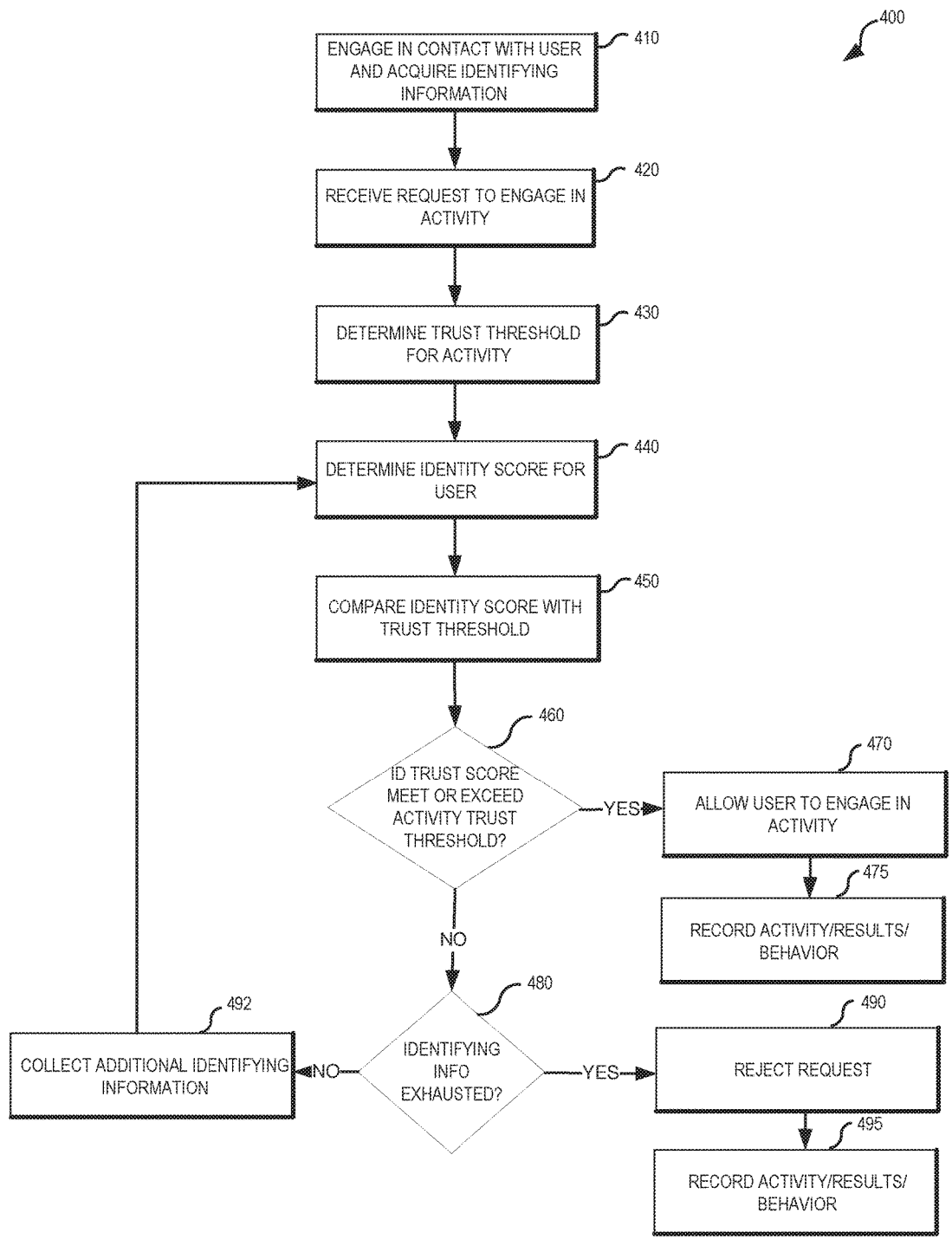
FIG. 4 is a flow chart illustrating a set of operations for determining whether to allow a user to engage in a restricted activity in accordance with some embodiments of the present disclosure.

FIG. 4 is a flowchart illustrating a set of exemplary operations for determining whether to allow a user to engage in a restricted activity in accordance with some embodiments of the present disclosure. Blocks 410-450 represent the same steps as discussed in blocks 310-350. At block 460, a determination is made whether the identity trust score meets or exceeds the activity trust threshold. If the identity trust score meets or exceeds the activity trust threshold, in block 470, the user is permitted to engage in the activity. In block 475, information related to the activity (e.g., type and nature of activity, channel), results, and behavior (e.g., number of attempted logons, time of day) is recorded for future use. Alternatively, if the identity trust score does not meet or exceed the activity trust threshold, block 480 determines whether the identifying information acquired in connection with the channel is exhausted, and whether other identifying information such as past user behavior data is available. If all identifying information has been exhausted, then in block 490, the user is rejected from engaging in the activity. In block 495, information related to the activity, results, and behavior is recorded. In some examples, the information may include associating a fraud alert with the user. If additional identifying information may be acquired, then in block 492, additional identifying information is collected or acquired. The collecting operation may be performed automatically or the user may be requested to provide additional identifying information. For example, while on the phone, the user's voice may be authenticated and thus the identity trust score is revised. Or the user may be asked to provide a one time password. Or the user may have acted in accordance with previous behaviors, thus raising the identity trust score. After the additional information is collected, the operation returns to block 440 to determine a revised identity trust score for the user, and to block 450 for the comparison operation. The process continues until the user is rejected or allowed to engage in the activity.

In some embodiments, situations exist in which no amount of additional identifying information will permit the user to engage in the activity. For example, if the user's location is determined to be in a country that raises the activity trust threshold to an extremely high level (e.g., requiring biometric data such as hair samples to reach an acceptable identity trust score), no amount of identifying information in that channel may overcome the activity trust threshold and thus the user is not permitted to engage in the activity. In another example, security preferences provided by the user may restrict activity. The security preferences may include rules pertaining to what activity is allowed or rules that restrict when activities can take place.

Figure 5:
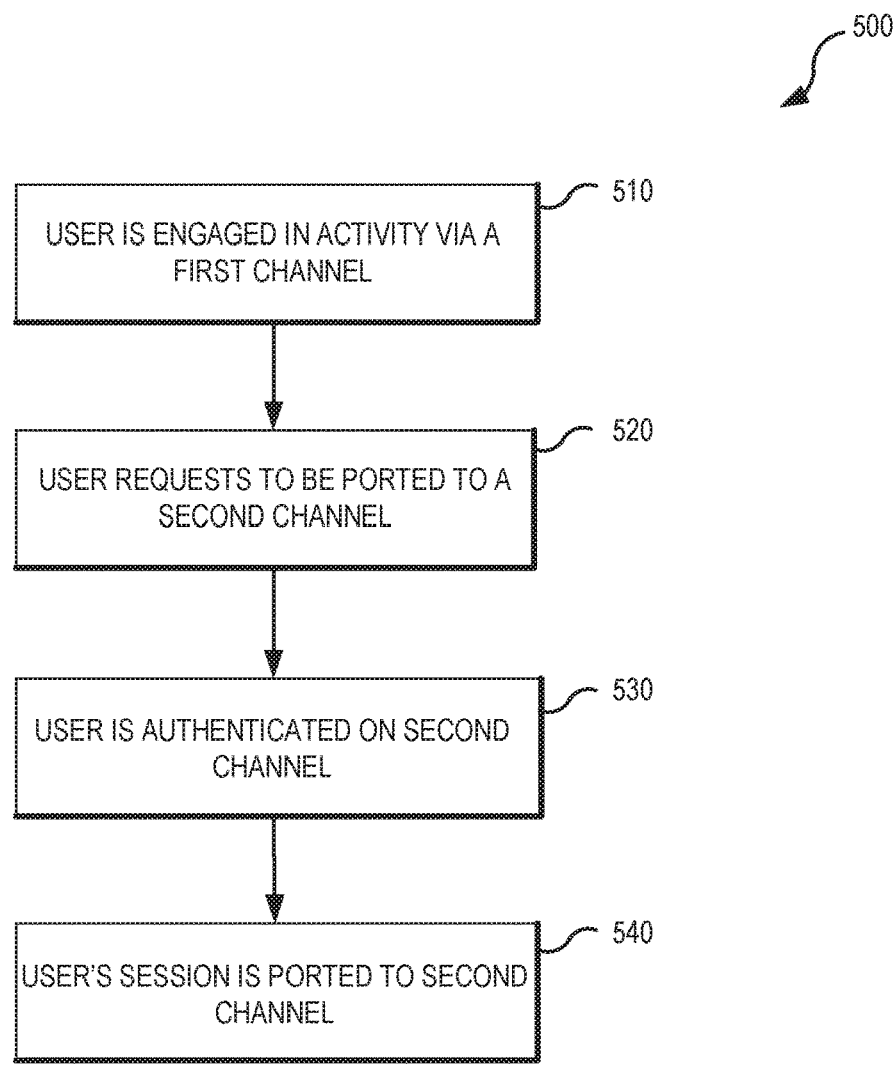
FIG. 5 is a flow chart illustrating a set of operations for a porting feature in accordance with some embodiments of the present disclosure.

FIG. 5 is a flow chart illustrating a set of exemplary operations for a porting feature in accordance with some embodiments of the present disclosure. In block 510, a user is engaged in an activity via a first channel. In block 520, the user requests that the session be ported to a second channel that is different than the first channel. In block 530, the user is authenticated on the second channel. In block 540, the user's session is ported to the second channel and the user can continue to engage in the activity. For example, the user is attempting to fill out a mortgage application using a mobile phone via a mobile phone application. The user may choose to complete the application during the same session but chooses to continue filling out the application on a personal computer. The activity trust threshold for this activity is determined to be low, and the user is authenticated simply by the device identification. Thus, the user can complete the application during the same session.

Figure 6:
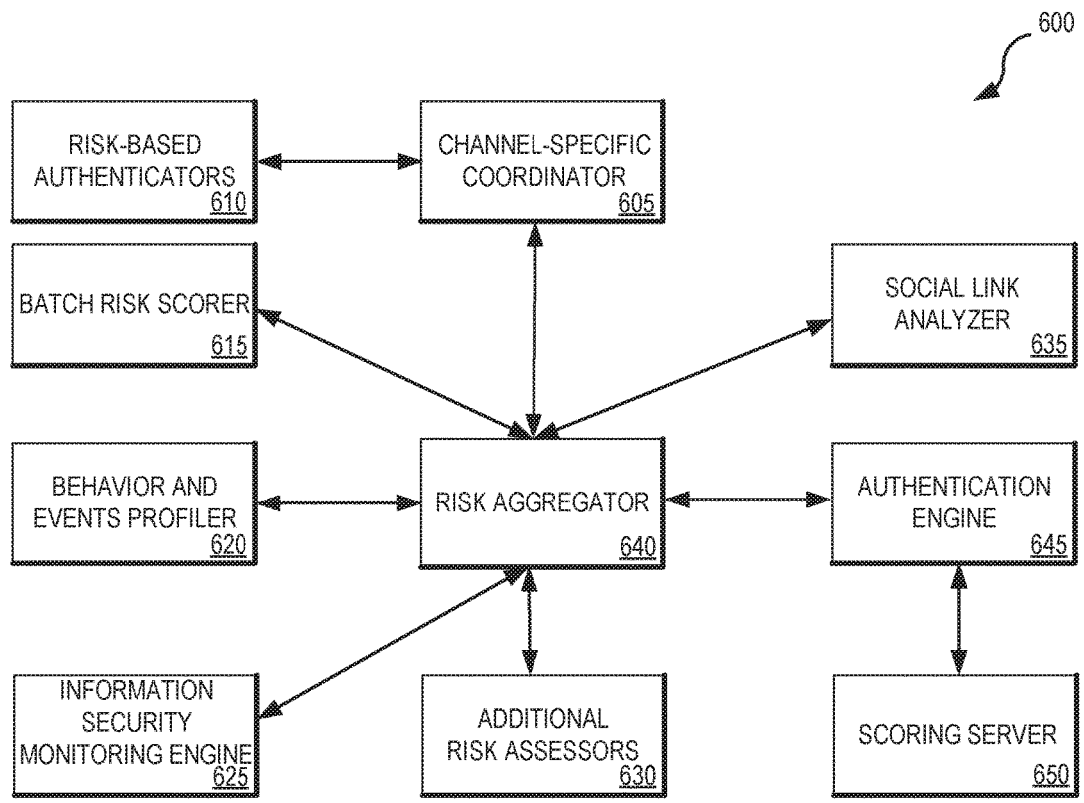
FIG. 6 illustrates possible components of a risk-based authentication system.

FIG. 6 illustrates an example of an operating environment in which some embodiments of the present disclosure may be utilized. More specifically, FIG. 6 illustrates possible components of a risk-based authentication system. As illustrated in FIG. 6, various embodiments of risk-based authentication system 600 can include channel-specific coordinator ("CSC") 605, risk-based authenticators 610, batch risk scorer 615, behavior and events profiler 620, information security monitoring 625, additional risk assessors 630, social link analyzer 635, risk aggregator 640, authentication engine 645, and scoring server 650.

CSC 605 may be configured to receive a request from a user to engage in a business event or activity such as making a purchase, updating address information, etc. CSC 605 may be configured to communicate the request to the risk aggregator 640 and receive, from risk aggregator 640, an authentication plan. CSC 605 may be further configured to execute the authentication plan. An authentication plan may include information detailing the how the user can be verified to the activity trust threshold. For example, the authentication plan may specify that the user should be asked for a PIN via the user's mobile application in order for the user to make a wire transfer. The authentication plan may specify the identity trust score that the user will reach if the user correctly or incorrectly provides the PIN. The authentication plan may further include directions on how the risk aggregator should respond to the current request (e.g., authenticate with no additional information, request additional authentication information, deny request, lock account, call user immediately, etc.). In some embodiments, the authentication plan makes a recommendation regarding the authentication information needed for the user to engage in the activity.

CSC 605 may also be configured to decipher the authentication plan. For example, CSC 605 may use a utility style interpreter to convert the response to a desired format. CSC 605 may distinguish between various applications such as an application to authenticate a user and an application related to business functions (e.g., view an account). In some embodiments, CSC 605 is configured to control the views that are displayed to the user based on the type of request. In an example, CSC 605 is configured to determine when to present a web view for a web-based application versus a native view for a mobile client-side based application to enforce the authentication plan. In some embodiments, CSC 605 further includes the functionality described with respect to authentication plan receiving/requesting module 770 and GUI generation module 780.

Depending upon the authentication plan, CSC 605 may make an authentication request to risk-based authenticators 610, which are various authentication applications. For example, if the authentication plan reveals that the user will reach an identity trust score that exceeds the activity trust threshold by providing a PIN via a mobile application, a mobile application authenticator will be used to receive the information and authenticate the user. CSC 605 may be configured to receive information relating to the successful/unsuccessful attempts from the risk-based authenticators 610 and provide this information to the risk aggregator 640 and/or authentication engine 645.

Risk-based authenticators 610 may be configured to receive a channel for the authentication (e.g., web portal, mobile application) and authentication information (e.g., mother's maiden name) provided by the user or the user device from CSC 605 and to authenticate the user to a certain state of authentication. For example, risk-based authenticators 610 may reach a state of successful completion (e.g., authenticate user to an identity trust score that meets or exceeds the activity trust threshold), an intermediate state allowing multiple authentication attempts from the user (e.g., if the user misspells a word or if the user cannot recall the street they grew up on), or may reach a state of authentication failure or even a state of lockout of the user account (e.g., if the user unsuccessfully attempts to login too many times). Regardless of the result, risk-based authenticator 610 may be configured to log the final authentication state and all the intermediate steps or attempts and provide this information to CSC 605.

Examples of types of authentication information or credentials received by the risk-based authenticators 610 may include answers to security questions, an SMS code, IVR call, secure token, KBA, biometrics, bingo card, enhanced CAPCHA, device fingerprint, secure browsing solution, information from the device such as a device fingerprint, or QRC cross device. In some embodiments, the authentication information may be collected from the device with no request to the user and/or no action from the user.

Risk aggregator 640 may be configured to receive requests for activities from CSC 605. Based on this request, risk aggregator 640 may be configured to request and collect and/or receive risk factors from any number of fraud monitoring engines such as batch risk scorer 615, behavior and events profiler 620, information security monitoring engine 625, additional risk assessors 630, and social link analyzer 635 in a parallel and synchronous/asynchronous manner. Risk aggregator 640 may collect and/or receive risk factors from more or fewer fraud monitoring engines, allowing the system to be scalable and adaptable to changing environments and threats. The risk factors may indicate that the event matches a known fraudulent pattern, that it is out of a typical behavior pattern for the user or similar user, that the event exceeds groundspeed rules or represents a high geo-location risk, that the event is risky when combined with prior things done by the user or device, that the parties are related to known bad networks/devices/other parties, and the inherent risk of the event.

Risk aggregator 640 may be configured to transform the risk factors into risk indicators by scoring or normalizing the risk factors. In some embodiments, the risk factors are weighed according to the fraud monitoring engine that supplies the risk factor and/or by the significance of the posed risk. Once the risk factors are transformed into risk indicators, risk aggregator 640 communicates the risk indicators to authentication engine 645. Risk aggregator 640 can be configured to receive an authentication plan from the authentication engine 645 and to communicate the authentication plan to CSC 605. Risk aggregator 640 may receive authentication results (e.g., attempts, channels or modes of authentication, etc.) from CSC 605.

Batch risk scorer 615 may be configured to analyze sessions against various scoring models and to generate a base customer risk score that is used in determining an overall risk score for a user's account. The base customer risk score may be generated on a periodic basis (e.g., daily), and as such, generally does not include authentication information relating to the current request. The base customer risk score answers the question "generally, how risky is this user account?" In doing so, batch risk scorer 615 analyzes data from the user's history with the organization. Information used to generate the base customer risk score may include, but are not limited to, data from other divisions of an organization (e.g., customer products) and member activity across channels (e.g., channels typically used generally and for the requested activity, recent activity with user account, etc.). Batch risk scorer 615 may generate scorecard models used in the behavior and event profiler based on the user data.

Batch risk scorer 615 calculates a risk level by mining a Big Data repository for indicators of risk according to known fraud and abuse patterns. Some example scenarios include excessive groundspeed across products, account takeover red flags, new account opening velocity, and behavior outside normal thresholds. The batch base customer risk score is calculated from the Big Data repository based upon historical customer, account, transaction, geo-location, device, and contact history data. During a business event such as logon, the base customer risk score is one of many risk score models that risk aggregator 640 assembles together into a Master Score Card model. The Master Score Card also includes elements of trust—facts about the session that lower the overall risk. The model scorecards found within behavior and events profiler 620, batch risk scorer 615, and social link analyzer 635 are separate and distinct scorecards that are inputs to the Master Scorecard Model that scoring server 650 produces.

In some embodiments, the batch risk scorer 615 may provide a base customer risk score, scorecard models, and other customer risk information to behavior and events profiler 620. In some embodiments, batch risk scorer 615 may be configured to provide authentication results to risk aggregator 640, including a log of the authentication information provided by the user or the user device, a channel used in the authentication or authentication attempts, the number of authentication attempts, etc.

Behavior and events profiler 620 may be configured to identify possible fraudulent behavior by monitoring various enterprise events and financial transactions and evaluating these events and transactions for possible fraud activity. Behavior and events profiler 620 may be configured to receive requests and provide risk factors such as alerts and case management based on behavioral profiling, complex events processing, and scorecard models for the user to the risk aggregator 640. Methods and systems for behavior profiling are described in commonly assigned, U.S. patent application Ser. No. 13/801,784, entitled "BEHAVIORAL PROFILING METHOD AND SYSTEM TO AUTHENTICATE A USER," which is herein incorporated by reference in its entirety for all purposes.

Information security monitoring engine 625 may be configured to maintain and provide access to alerts generated via enterprise information security components. Such components may include Cyber Threat Operation Center (CTOC), which collects information from network devices or a security consortium and generates alerts against potential risky connections to internal networks. Information security monitoring 625 may be configured to receive requests from and provide alerts to risk aggregator 640.

Additional risk assessors 630 may be configured to receive user information and risk information from various internal and external sources and to provide additional information relating to the user or the user's device. Examples of additional risk assessors include a device scoring risk assessor (e.g., evaluating groundspeed and IP reputation), device registration risk assessor (e.g., whether the device has been registered with the organization, whether the device is on a watch list), device recognition risk assessor (e.g., taking a device fingerprint and determining whether it matches with a device fingerprint in the user's profile), fraud consortium risk assessor (e.g., companies that share watchlists and information about parties who have committed prior fraud), hotfiles risk assessor (e.g., lists of known fraudsters within the organization), ID risk assessor (e.g., is ID flagged as risky), money laundering risk assessor (e.g., determining whether the transaction has characteristics of a money laundering event), deposit risk assessor (e.g., a deposit float management system), or a credit report indicators risk assessor, among others. These risk assessors may request information from a third party. Risk assessors can be hot-pluggable, allowing for enabling and disabling as needed or desired.

In some embodiments, the additional risk assessors may run a scoring model on input data and run rules against a requested activity to generate a risk assessment. Such risk assessments may include reason codes explaining the score and provide insight as to the risk factor having the most significant impact on the score. Risk aggregator 640 may request risk assessments from various risk assessors depending upon the activity or other information received by risk aggregator 640. Additional risk assessors 630, as well batch risk scorer 615, behavior and events profiler 620, information security monitoring engine, social link analyzer 635 can send information and/or risk assessments to risk aggregator 640 in real-time or in batch mode.

Social link analyzer 635 may be configured to build a network of interconnection to relate people and events in order to provide additional risk factors. For example, the social link analysis tool may detect if a user is connected to a phone number that is currently or was on a hotlist through several degrees of separation. In another example, if the user is married to a person who has a hotlisted phone number, the system may flag the user as being a person of interest. Such information may be requested by and provided to risk aggregator 640.

Social link analyzer 635 may also gather and analyze social media information from third party and public sources such as blogs, social media posts, news articles, public records, affiliates, connections on social media sites such as Facebook® and LinkedIn®. This social media may be used in building a user's network of interconnections.

Authentication engine 645 may be configured to receive risk indicators from risk aggregator 640 (e.g., base risk score, alert aggregation, behavioral model, predictive models, session risk, CEP, social network risk, additional risk assessors, etc.), receive an identity trust score from scoring server 650, compare the identity trust score to the activity trust threshold, and determine whether the user has been authenticated to the required activity trust threshold for the current request. If the user has not been authenticated to the required activity trust threshold, authentication engine 645 may be configured to determine a risk-based authenticator and authentication information to achieve the required activity trust threshold.

Authentication engine 645 may be configured to provide risk indicators to scoring server 650 and to request and receive an identity trust score from scoring server 650. If the user has not been authenticated at or above the activity trust threshold, authentication engine 645 determines what authentication is needed for the user's identity trust score to reach the activity trust threshold. In some embodiments, several different methods of authentication would suffice to raise the user's identity trust score to meet or exceed the activity trust threshold.

The determinations from authentication engine 645 may be sent to the risk aggregator 640 as an authentication plan (e.g., request user to provide PIN). The authentication plan may be generated by considering the customer's stated authentication preferences, the operational status of the authenticators, an invasiveness of the authentication requests, and the effectiveness of the authenticator with respect to the channel and operation being requested. In some embodiments, the authentication plan may be designed to minimize the use of invasive active authentication measures (e.g., answering security questions) in order to meet the required threshold. Thus, the authentication plan may recommend the plan using the least invasive authentication collection method. The authentication methods may be ranked in order of most invasive to least invasive. Authentication engine 645 may further be configured to assess the risk on any channel at any time. In some embodiments, the authentication plan may be dependent on the channel. In other embodiments, the authentication plan is channel-independent.

Authentication engine 645 may apply rules to generate the authentication plan. For example, authentication engine 645 may account for invasiveness of the authentication (with a preference towards passive methods of authentication such as device fingerprinting), user preferences, the channel, a device, etc. The methods of authentication may be prioritized. For example, the method of authentication with the highest priority may be the method requesting passive information from the device currently being used. In some embodiments, authentication engine 645 may update the authentication logs with the authentication plan. Authentication engine 645 may account for regulatory rules. For example, the authentication plan returned may require NIST level 3 strength authenticators for every request of a particular activity, independent of activity risk and identity trust score gained.

Scoring server 650 may be configured to receive risk indicators from authentication engine 645 and to calculate an identity trust score for the user. Risk indicators that may be included in the scoring include a base risk score for the customer, aggregated alerts, behavioral model, predictive models, session risk, complex events processing, and social network risk. In calculating the identity trust score, scoring server 650 may analyze the input data for a chosen set of variables and based on certain weightage around a combination of all such data inputs, calculate the identity trust score for the request and/or session. The scoring server 650 may weigh these risk indicators differently depending upon business rules, risks and regulations. In some embodiments, scoring server 650 normalizes the score by channel. Thus, if the user provides the same information on a different channel, the user's score may be impacted differently.

Figure 7:
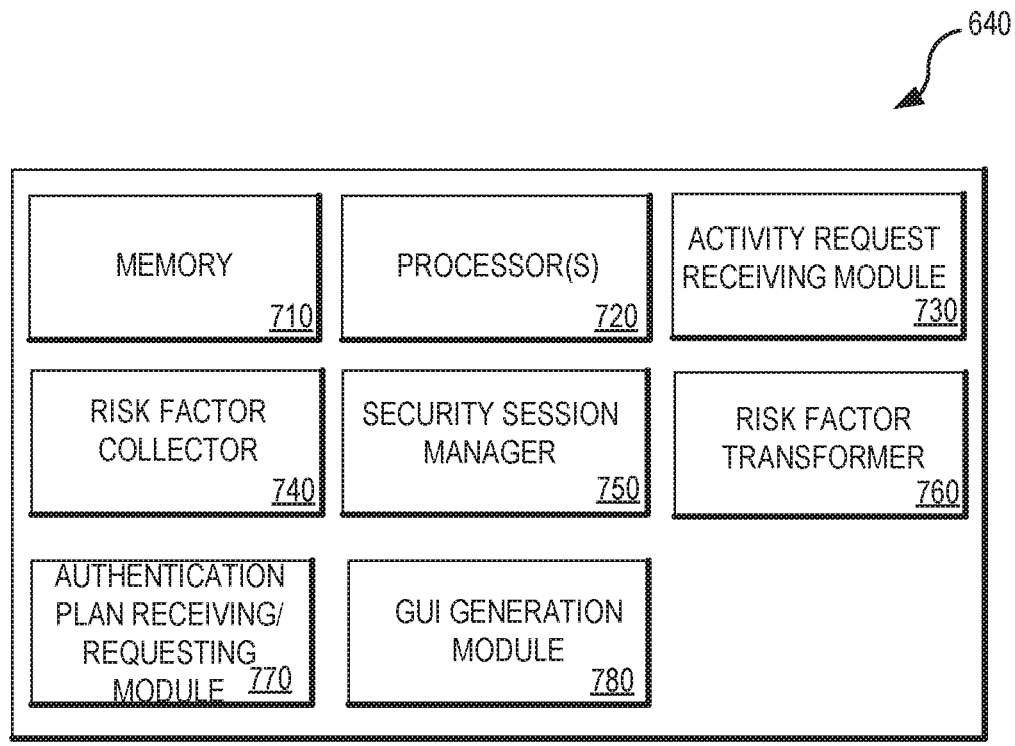
FIG. 7 is a block diagram illustrating components that can be included in a risk aggregator in accordance with various embodiments of the present disclosure.

FIG. 7 is a block diagram illustrating components that can be included in a risk aggregator, such as risk aggregator 640. According to the embodiments shown in FIG. 7, the risk aggregator 640 may include memory 710, one or more processors 720, activity request receiving module 730, risk factor collector 740, security session manager 750, risk factor transformer 760, authentication plan receiving/requesting module 770, and graphical user interface generation ("GUI") module 780. Other embodiments of the present disclosure may include some, all, or none of these modules and components along with other modules, applications, and/or components.

Furthermore, some embodiments may incorporate two or more of these modules into a single module and/or associate a portion of the functionality of one or more of these modules with a different module.

Memory 710 can be any device, mechanism, or populated data structure used for storing information as described above with regard to memory 210. Memory 710 may be used to store instructions for running one or more applications or modules on processor(s) 720. For example, memory 710 could be used in one or more embodiments to house all or some of the instructions needed to execute the functionality of activity request receiving module 730, risk factor collector 740, security session manager 750, risk factor transformer 760, authentication plan receiving/requesting module 770, and GUI generation module 780.

Activity request receiving module 730 may be configured to receive information relating to an activity request (e.g., identity claim, activity type) from CSC 605. Upon receiving the information, the activity request receiving module 730 may analyze the information relating to the activity request and signal risk factor collector 740 to begin collecting risk factors from various components. Based on the identity claim and/or the activity, activity request receiving module 730 may signal risk factor collector 740 to collect specific information.

Risk factor collector 740 may be configured to receive a signal from activity request receiving module 730. In response to receiving such a signal, risk factor collector 740 may request risk factors from various systems and components such as behavior and events profiler 620 (e.g., CEP results, a behavioral profile, customer risk score model, and/or alerts and case management based on this information), batch risk scorer 615 (e.g., a base risk score associated with the customer), information security monitoring 625 (e.g., device logs, network security, and/or alerts based on this and similar information security data), and/or additional risk assessors 630.

Security session manager 750 may be configured to collect all information on authentication state/history and activity history of the current session and to log authentication results. Authentication state/history and activity history may include the current identity trust score of the customer, whether the user is currently in a session, the last time the user logged in, the device that was used, how many login attempts were taken, etc. In some embodiments, activity history information may be collected/received from a customer risk data store associated with the batch risk scorer 615. Security session manager 750 may operate to persist related and similar data to a globally accessible and highly available database and/or log entry into an activity log or publish the event that an activity has been requested for other enterprise components to listen and act upon. For example, if additional credentials are received, security session manager 750 logs the time, channel, and method and whether the received credentials raise, lower, or do not affect the identity trust score.

Risk factor transformer 760 may be configured to receive the risk factors from the batch risk scorer 615, behavior and events profiler 620, information security monitoring 625, additional risk assessors 630, social link analyzer 635, and other fraud monitoring engines. This information may be received into the risk factor transformer 760 as raw data, and the risk factor transformer 760 may be configured to format the raw data into risk indicators. The risk indicators may be transferred to the authentication engine 645. In some embodiments, the risk factor transformer 760 weighs the risk indicators based upon their origin. 118. In some embodiments, scoring server 650 may be used by the risk factor transformer 760 to aggregate the risk factors and to transform the risk factors into risk indicators.

Authentication plan receiving/requesting module 770 may be configured to request an authentication plan from the authentication engine 645 outlining the authentication credentials needed for the user to engage in the activity. Authentication plan receiving/requesting module 770 may be configured to receive the authentication plan after the authentication engine 645 has generated the plan.

GUI generation module 780 may be configured to generate one or more GUI screens that allow for interaction with a user or a representative. In at least one embodiment, GUI generation module 780 generates a graphical user interface allowing a user to provide authentication information such as a PIN, username, password, etc., or to execute an activity such as a funds transfer, product purchase, loan application, etc. GUI generation module 780 may generate a GUI allowing a representative to review an authentication request and/or otherwise receive or convey information to the user.

Figure 8:
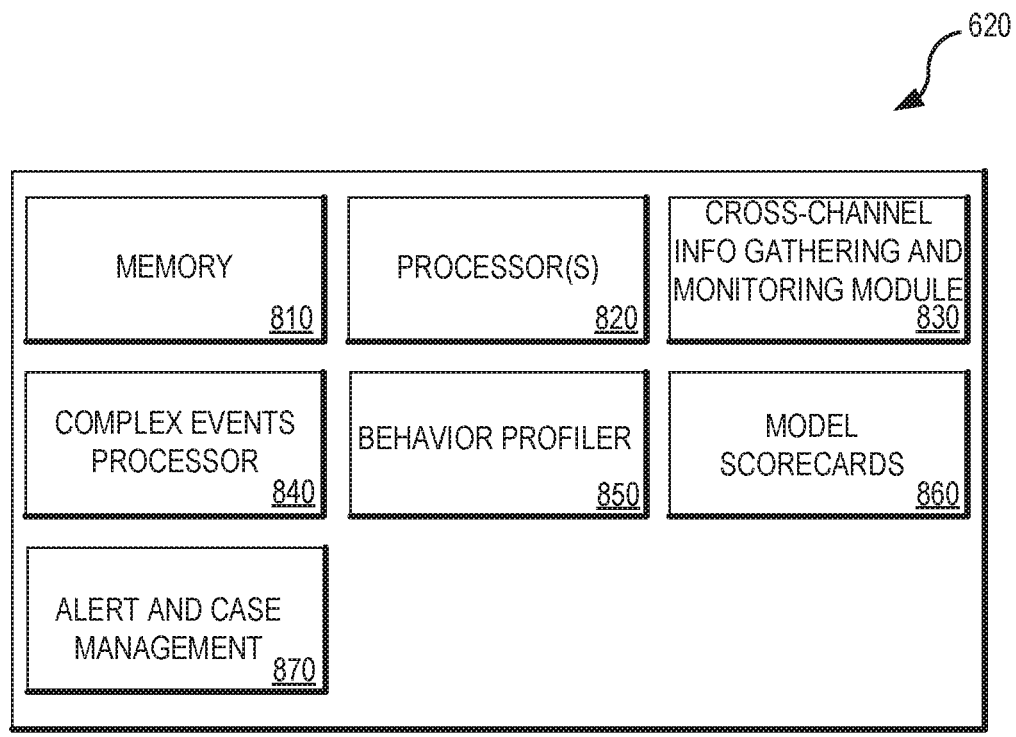
FIG. 8 is a block diagram illustrating components that can be included in an identity authentication system in accordance with various embodiments of the present disclosure.

FIG. 8 is a block diagram illustrating components that can be included in behavior and events profiling system, such as behavior and events profiler 620. According to the embodiments shown in FIG. 8, the behavior and events profiler 620 may include memory 810, processor(s) 820, cross-channel information gathering and monitoring module 830, complex events processor 840, behavior profiler 850, model scorecards 860, and alert and case management 870. Other embodiments of the present disclosure may include some, all, or none of these modules and components along with other modules, applications, and/or components. Furthermore, some embodiments may incorporate two or more of these modules into a single module and/or associate a portion of the functionality of one or more of these modules with a different module.

Memory 810 can be any device, mechanism, or populated data structure used for storing information as described above with regard to memory 210. Memory 810 may be used to store instructions for running one or more applications or modules on processor(s) 820. For example, memory 810 could be used in one or more embodiments to house all or some of the instructions needed to execute the functionality of memory 810, processor(s) 820, cross-channel information gathering and monitoring module 830, complex events processor 840, behavior profiler 850, model scorecards 860, and alert and case management 870.

Cross-channel information gathering and monitoring module 830 may be configured to monitor user activity across all channels (e.g., web portal, mobile application) and across divisions of the organization (e.g., insurance, banking, and investments). Such information may be provided to complex events processor 840, behavior profiler 850, model scorecards 860, and alert and case management 870.

Complex events processor ("CEP") 840 may be configured to listen for enterprise events and correlate those around rules that would trigger alerts such as a change of mailing address in a previous recent session and a request for a credit card soon after.

Behavior profiler 850 may be configured to receive information relating to user activities, analyze the information to generate an activity and/or behavior pattern for the user, and group the user into behavior categories. Using the behavior categories and/or the behavior pattern, the behavior profiler 850 may be configured to establish or predict a user's behavior and provide alerts to alert and case management 870 when the user's activity pattern for a session violates the established or predicted behavior pattern as established in model scorecards 860. In some embodiments, the user's behavior is compared to the behavior of people in the users' financial peer group. Behavior may include a behavior DNA (e.g., how quickly a person types, the pressure used on a keyboard, etc.) of a person. Behavior profile may be configured to use a similar analysis on devices. Information used to generate the user's (or the device's) behavior pattern may be received from cross-channel information gathering and monitoring module 830.

Model scorecards 860 may be configured to provide a behavior model based on the user's previous behaviors. Multiple scorecard models, such as those from batch scoring, social link analyzer scoring, and other risk assessors, may be used to generate the score produced by scoring server 650.

Alert and case management 870 may be configured to receive alerts (e.g., relating to a behavior pattern of the user) from behavior profiler 850 and CEP 840 and send the alerts to risk aggregator 640.

Figure 9:
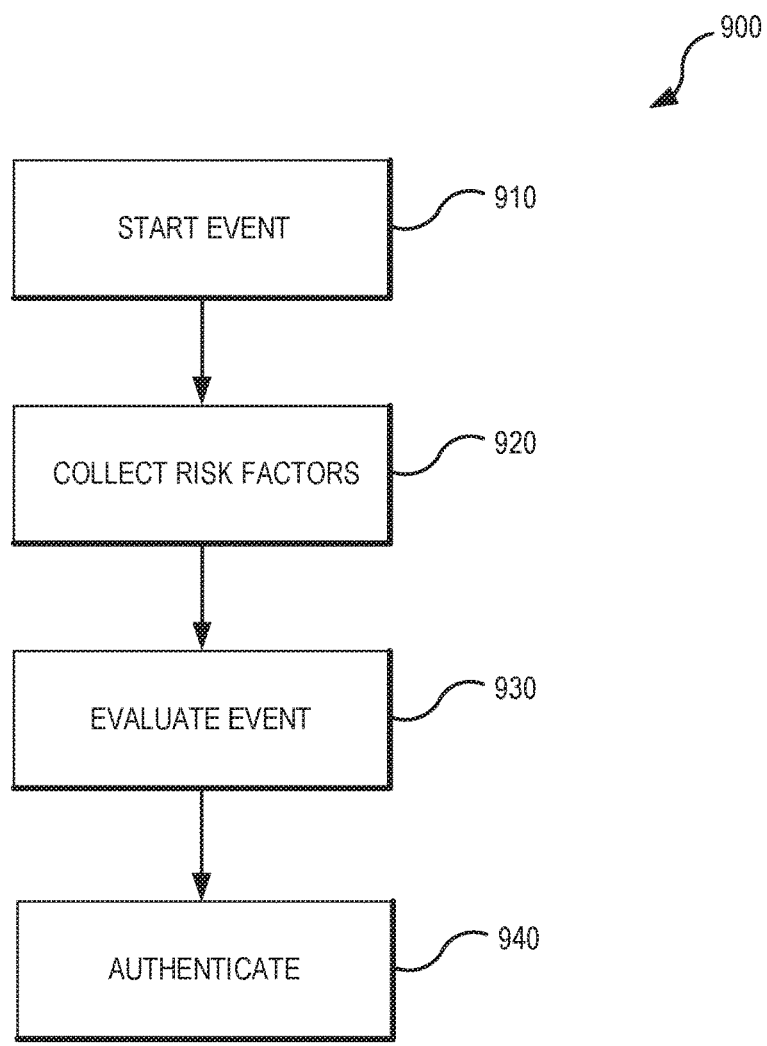
FIG. 9 is a flow chart illustrating a set of operations for determining whether to allow a user to engage in a restricted activity in accordance with some embodiments of the present disclosure.

FIG. 9 is a flow chart illustrating a set of operations 900 for allowing a user to engage in a restricted activity in accordance with various embodiments of the present disclosure. The operations can be performed by various components such as processor(s) 720 and activity request receiving module 730, among others.

Event start operation 910 begins an event, such as a request to engage in a financial transaction, open a new account, order a new credit card, update address information, etc. This may take place on any channel (e.g., phone call, mobile application, web portal, etc.). Collecting operation 920 collects risk factors from various components. The risk factors may relate to the user, the channel, or the device used to make the request. In some embodiments, the risk factors relate to the organization. Based on the risk factors and the nature of the event, event evaluation operation 930 evaluates a riskiness of the event and translates this into an activity trust threshold necessary for the user to meet and/or exceed prior to engaging in the activity. Various authenticator applications may be activated in authenticate operation 940.

Figure 10:
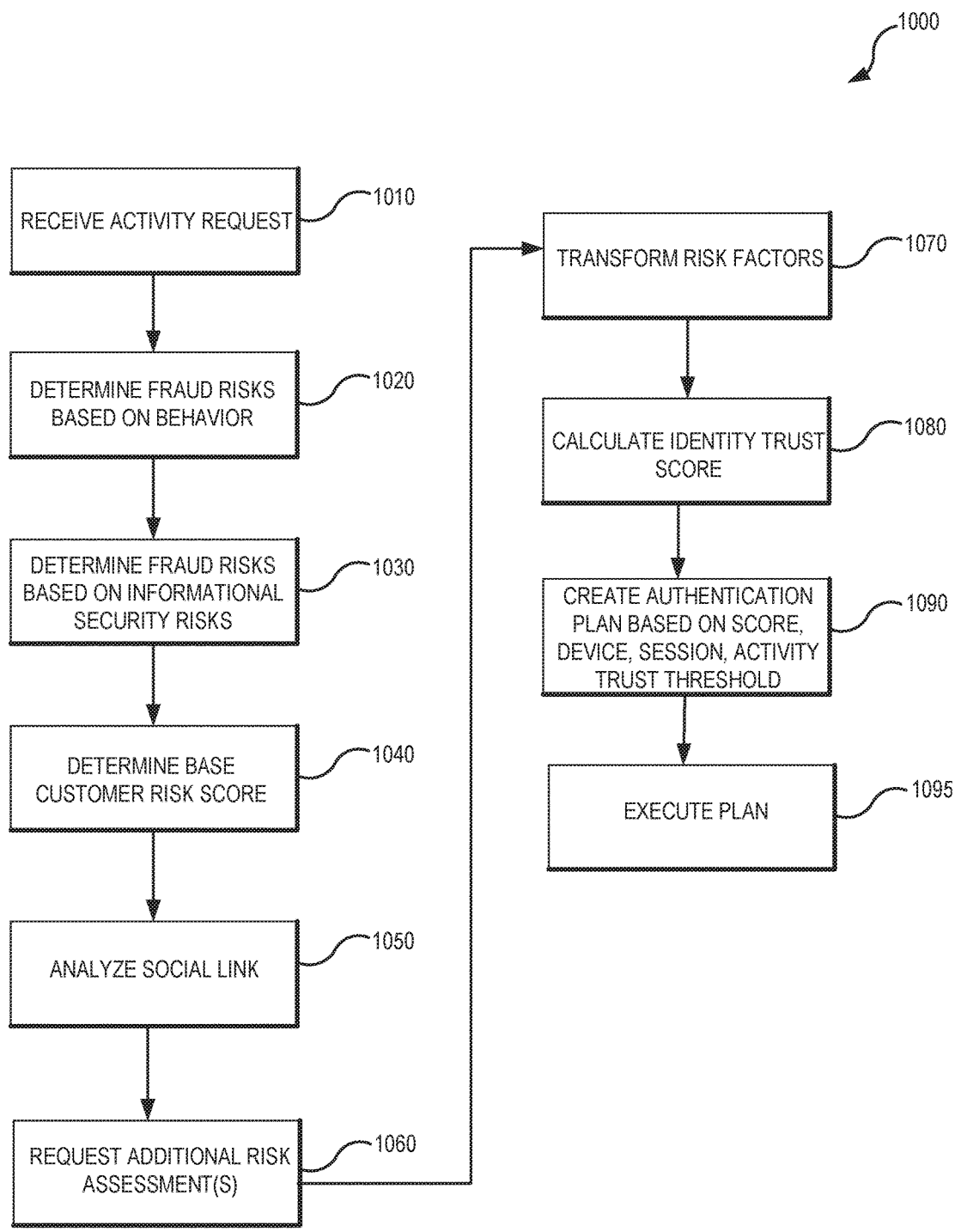
FIG. 10 is a flow chart illustrating a set of operations for determining whether to allow a user to engage in a restricted activity in accordance with some embodiments of the present disclosure.

FIG. 10 is a flow chart illustrating a set of operations 1000 for allowing a user to engage in a restricted activity in accordance with various embodiments of the present disclosure. The operations can be performed by various components such as processor(s) 720 and activity request receiving module 730, among others.

Activity request operation 1010 receives a request from a user to engage in an activity. The activity may be a monetary transaction (e.g., new purchases, investment activities) or a non-monetary transaction (e.g., new account opening, card ordering request, credit increase, personal status change, account party change). The activity request may begin a number of risk collection and determination operations, such as fraud risk based on behavior determination operation 1020, fraud risk based on informational security risks determination operation 1030, base customer risk score determination operation 1040, social link analyzing operation 1050, and additional risk assessment request operation 1060.

Fraud risk based on behavior determination operation 1020 determines fraud risk based on the requesting user's behavior. For example, a behavior profile may be accessed and used to determine if the user is acting as the user or the user's peers typically act (e.g., browsing in the order the user typically browses, engaging in activities at typical times). Complex events processing may further indicate fraud by analyzing events for fraudulent patterns.

Fraud risk based on informational security risks determination operation 1030 determines risk factors based on informational security. For example, alerts against potentially risky connections to internal networks may be determined during this operation.

Base customer risk score determination operation 1040 may determine a fraud risk level for the customer based on the user's activity across all divisions in the company and based on the user's profile. For example, if the user had recently been a victim of identity theft, the customer's base risk score may be increased.

Social link analyzing operation 1050 analyzes the user's social network to determine if there are any social links indicating fraud based on the user's associations. A social network may be created by identifying relationships between customers and non-customers through the use of common, identifying information such as a same address, same telephone number, previously identified family members, social media connections, etc.

Additional risk assessment(s) request operation 1060 may request risk information such as lists identifying known threats (persons, devices, IP addresses, networks, etc.), credit reporting agencies, etc. This operation may further determine whether the user or the user's device is included on one of the lists.

Transformation operation 1070 transforms the raw risk factors determined from the fraud risk based on behavior determination operation 1020, fraud risks based on informational security risks determination operation 1030, base customer risk score determination operation 1040, social link analyzing operation 1050, and risk assessment request operation 1060, and formats the risk factors into risk indicators.

Identity trust score calculation operation 1080 receives the risk indicators and determines an identity trust score for the user. Various algorithms may be used to determine the identity trust score.

Based on the identity trust score, the type of device currently being used by the user or a preferred device/method of authentication, and the activity trust threshold (measure of riskiness of the activity), authentication plan creation operation 1090 creates an authentication plan for the user. The authentication plan may specify the type of device and credentials required for the user's identity trust score to meet the trust score needed to engage in the activity (e.g., PIN using mobile application). In some embodiments, the authentication plan may indicate that the user is already authorized and no further action is necessary. In some embodiments, the user may be denied access to the activity entirely (e.g., if there too many authentication attempts or if the identity trust score indicates that there is likely fraudulent behavior).

In response to the creation of the authentication plan, plan execution operation 1095 executes the plan by sending an authentication request, information detailing why the user is not authenticating, or allowing the user to engage in the activity.

Figure 11:
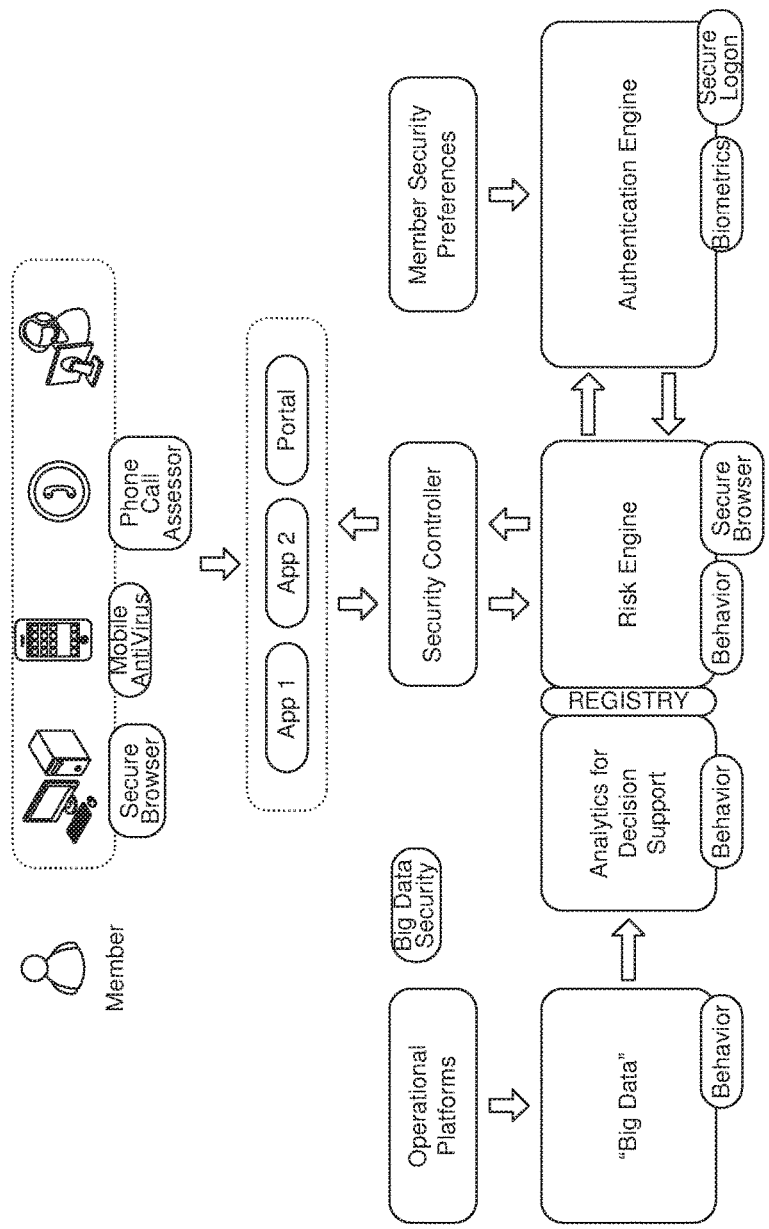
FIG. 11 is a diagram illustrating a flow in accordance with some embodiments of the present disclosure.

FIG. 11 is a diagram illustrating a flow in accordance with some embodiments of the present disclosure. In FIG. 11, the member contacts the organization using a device (e.g., mobile phone, computer) over a channel (e.g., mobile application). The contact may include a request to authenticate or to partake in one or more business activities (e.g., check account funds, set up direct deposit). The contact may be via a phone, desktop or personal computer, credit card swiping device, or other methods. The member's request may be processed by a Security Controller. The Security Controller may be responsible for orchestrating all actions required to get the customer to an authenticated state, which could include collecting risk and trust factors, communicating with external risk assessors, or requesting the Master Scorecard and authentication plan generation. The user may be passively authenticated to a certain level based on actions taken by the user or information gathered from the device.

The Security Controller may communicate the request to the risk engine. The risk engine may receive risk factors determined and analyzed by various components, such as a behavior profiler, CEP, and others. The risk factors may be alerts, information relating to the device, etc. Information relating to the member, other members, the organization security system, cyber threats, and others may be collected (e.g., Big Data) and analyzed to generate the risk factors. The risk engine may calculate a trust score for the member, quantifying how confident the system is that the person requesting the activity is the member. The risk engine may also calculate an activity trust threshold, quantifying a confidence level in the requestor's identity necessary for the member to proceed with the activity. The authentication engine may recommend or generate an authentication plan. The authentication plan may recommend a step-up in the identity trust score prior to allowing the user to proceed. The authentication plan may also recommend step-up based on the user's security preference. The authentication plan may include multiple channels and methods of authentication (e.g., biometrics) for the user to step-up the identity trust score.

Computer System Overview

Figure 12:
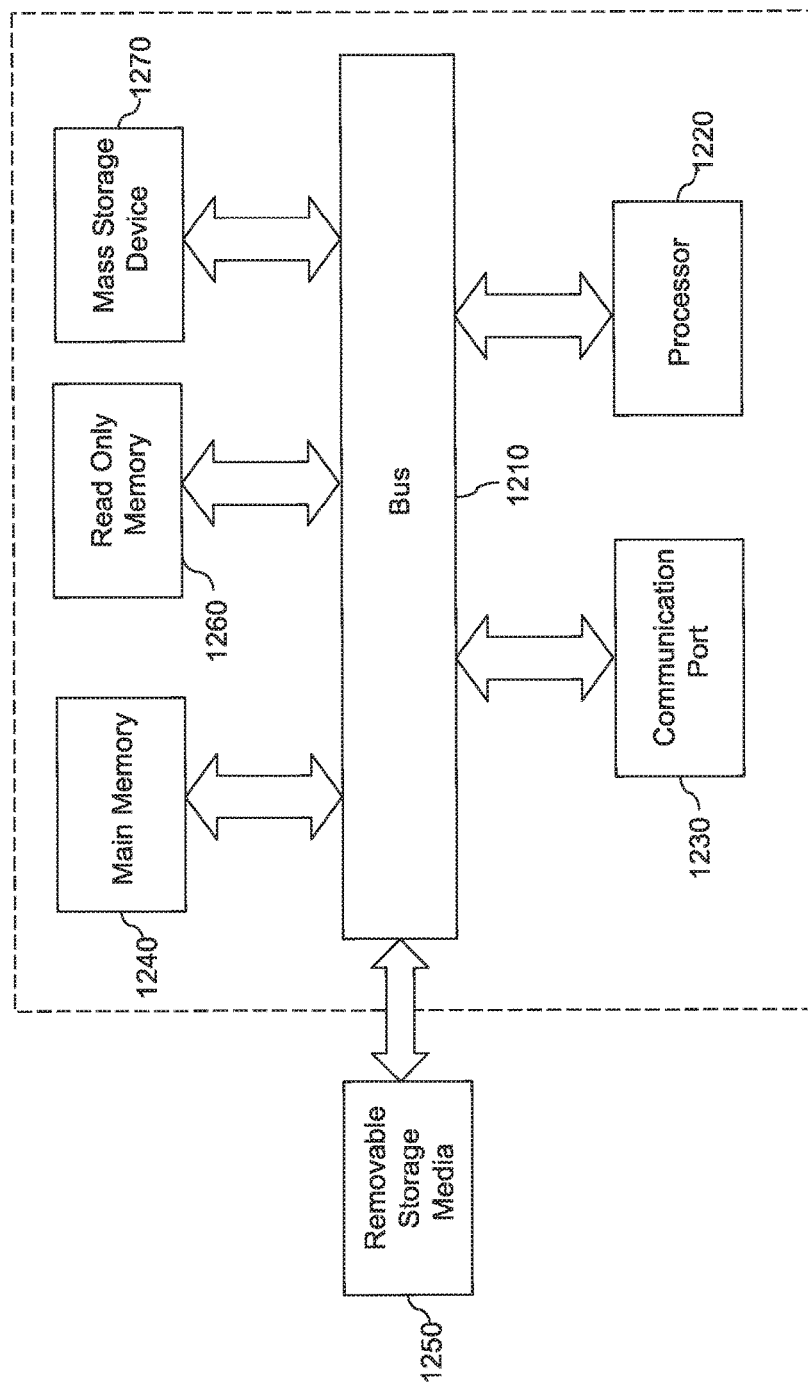
FIG. 12 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 12 is an example of a computer system 1200 with which embodiments of the present disclosure may be utilized. According to the present example, the computer system includes a bus 1210, at least one processor 1220, at least one communication port 1230, a main memory 1240, a removable storage media 1250, a read only memory 1260, and a mass storage device 1270.

Processor(s) 1220 can be any known processor, such as, but not limited to, an Intel® Itanium® or Itanium 2® processor(s), or AMD® Opteron® or Athlon MP® processor(s), or Motorola® lines of processors. Communication port(s) 1230 can be any of an RS-232 port for use with a modem-based dialup connection, a 10/100 Ethernet port, or a Gigabit port using copper or fiber. Communication port(s) 1230 may be chosen depending on a network such a Local Area Network (LAN), Wide Area Network (WAN), or any network to which the computer system 1200 connects.

Main memory 1240 can be Random Access Memory (RAM), or any other dynamic storage device(s) commonly known in the art. Read only memory 1260 can be any static storage device(s) such as Programmable Read Only Memory (PROM) chips for storing static information such as instructions for processor 1220.

Mass storage device 1270 can be used to store information and instructions. For example, hard disks such as the Adaptec® family of SCSI drives, an optical disc, an array of disks such as RAID, such as the Adaptec family of RAID drives, or any other mass storage devices may be used.

Bus 1210 communicatively couples processor(s) 1220 with the other memory, storage, and communication blocks. Bus 1210 can be a PCI/PCI-X or SCSI based system bus depending on the storage devices used.

Removable storage media 1250 can be any kind of external hard-drives, floppy drives, IOMEGA® Zip Drives, Compact Disc—Read Only Memory (CD-ROM), Compact Disc-Re-Writable (CD-RW), or Digital Video Disk-Read Only Memory (DVD-ROM).

The components described above are meant to exemplify some types of possibilities. In no way should the aforementioned examples limit the scope of the disclosure, as they are only exemplary embodiments.

TERMINOLOGY

Brief definitions of terms, abbreviations, and phrases used throughout this application are given below.

The term "user" may include a person and/or any endpoint computing device.

The term "identity trust score" means the score given to the amount of confidence in the user's identity claim.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present disclosure may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present disclosure may also be downloaded as a computer program product, wherein the program may be transferred from a remote computer to a requesting computer by way of data signals embodied in a carrier wave or other propagation medium via a communication link (e.g., a modem or network connection).

Also, for the sake of illustration, various embodiments of the present disclosure have herein been described in the context of computer programs, physical components, and logical interactions within modern computer networks. Importantly, while these embodiments describe various aspects of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead exemplary. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for risk-based authentication systems and methods. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting the scope of the disclosure, which is defined by the appended claims.

What is claimed is:

1. A scalable, risk-based authentication system comprising:
    a memory;
    a processor in communication with the memory, the processor operable to execute software modules, the software modules comprising:
        a plurality of fraud monitoring engines to:
            analyze user data and organization data, and
            generate a set of risk factors based on the user data and the organization data;
        wherein the plurality of fraud monitoring engines includes:
            a batch risk scorer to periodically generate an indication of an overall risk of a user account based on user patterns and previous alerts associated with the user account;
            an information security monitoring engine to access alerts relating to enterprise information security; and
            a social network analyzer to analyze the user's social network to identify relationships indicating fraud;
        a risk aggregator in communication with the plurality of fraud monitoring engines to:
            receive the set of risk factors, and
            transform the set of risk factors into risk indicators;
            wherein the risk factors indicative of the user's behavior include alerts related to the behavior of the user, wherein the alerts are determined by;
                comparing the behavior of the user with the behavior of a peer group of the user;
                determining whether the behavior of the user deviates from the behavior of the peer group of the user above a threshold level; and
                generating an alert when the behavior of the user deviates above the threshold level; and
        an authentication engine to:
            receive the risk indicators from the risk aggregator, and
            rank authentication methods according to a level of invasiveness, wherein the most invasive authentication methods require user-provided information, wherein the least invasive authentication methods no user-provided information;
            generate an authentication plan for a requested activity that includes an authentication method, wherein the authentication plan is based on the level of user invasiveness required by the authentication method, the risk indicators and the requested activity.

2. The system of claim 1, wherein the plurality of fraud monitoring engines includes:
    a behavior and events profiler to:
        analyze complex relationships within the user data to detect user behavior patterns indicating potentially fraudulent behavior; and
        generate an alert when the user behavior patterns indicate potentially fraudulent behavior.

3. The system of claim 2, wherein the behavior and events profiler is further to:
    compare user behavior to historical user behavior;
    determine whether the user behavior deviates from the historical user behavior above a threshold level; and
    generate an alert when the user behavior deviates above the threshold level.

4. The system of claim 1, wherein the plurality of fraud monitoring engines includes: one or more risk assessors to assess risk by:
    determining whether a user device associated with the request is identified on a government published list of terrorist groups;
    assessing an internet protocol address associated with the user device based on internet protocol reputation; and
    reviewing a status of the user device as registered with the terrorist groups.

5. The system of claim 1, wherein, to generate the authentication plan, the authentication engine is further to:
    calculate an identity trust score based on the risk indicators; and
    compare the identity trust score to an activity trust threshold for the requested activity.

6. The system of claim 1, wherein the authentication plan is further based on user preferences and a channel used to request the activity.

7. The system of claim 1, wherein the risk aggregator is further to: update an authentication log with the authentication plan.

8. The system of claim 1, wherein the authentication plan includes one of: requesting authentication information from the user, allowing the user to proceed with the activity without receiving authentication information, or denying the request to proceed with the activity.

9. The system of claim 8, wherein the software modules further comprise:
    a set of risk-based authenticators to receive and verify authentication credentials from the user,
        wherein, when the authentication plan requests authentication information from the user, the authentication plan identifies at least one risk-based authenticator to receive and verify the authentication credentials based on a type of user device and channel.

10. The system of claim 1, wherein transforming the risk factors into risk indicators includes weighting the risk factors based on the fraud monitoring engine the risk factor is received from.

11. A method for creating an authentication plan, comprising:
- receiving, from a user device via a channel, an activity request from a user;
- in response to the request, aggregating risk factors indicative of behavior of the user, the user device, and security and risk intelligence of an organization;
- transforming the risk factors into risk indicators;
- calculating an identity trust score based on the risk indicators wherein the risk indicators include an overall risk of a user account based on user patterns and previous alerts associated with the account, enterprise information security, and the user's social network to identify relationships indicating fraud;
- comparing the identity trust score to an activity trust threshold for the requested activity;
- ranking authentication methods according to a level of invasiveness, wherein the most invasive authentication methods require user-provided information, wherein the least invasive authentication methods require no user-provided information; and
- generating an authentication plan that includes an authentication method, wherein the authentication plan is based on the comparison, the level of user invasiveness required by the authentication method, and the channel used in requesting the activity, wherein the risk indicators of the user include alerts related to the behavior of the user, wherein the alerts are determined by:
  - comparing the behavior of the user with behavior of a peer group of the user;
  - determining whether the behavior of the user deviates from the behavior of the peer group of the user above a threshold level; and
  - generating an alert when the behavior of the user deviates above the threshold level.

12. The method of claim 11, further comprising:
- comparing behavior of the user with historical behavior of the user;
- determining whether the behavior of the user deviates from the historical behavior of the user above a threshold level; and
- either decreasing the identity trust score when the behavior of the user deviates above the threshold level or increasing the identity trust score when the behavior matches the historical behavior of the user.

13. The method of claim 11, wherein the risk factors are further indicative of the user's social network and a base risk score associated with the user, the base risk score generated based on user activity across multiple channels and prior user behavior.

14. The method of claim 13, wherein the method further comprises periodically generating the base risk score for the user.

15. The method of claim 11, wherein the risk factors associated with the user device include information relating to at least one of: internet protocol reputation, ground speed, device registration, device recognition, channel risk, inclusion or exclusion from government identified fraud lists or fraud consortium lists, a device identification risk, money laundering risk, or deposit risk assessment.

16. The method of claim 11, wherein the authentication plan is further based on user preferences and the user device used to request the activity.

17. The method of claim 11, wherein the authentication plan includes one of: requesting authentication information from the user; allowing the user to proceed with the activity without receiving authentication information; or denying the request to proceed with the activity.

18. A non-transitory computer-readable storage medium including a set of instructions that, when executed by one or more processors, causes the one or more processors to perform operations comprising:
- receiving, from a user device via a channel, an activity request from a user;
- in response to the request, aggregate risk factors indicative of behavior of the user, the user device, and security and risk intelligence of an organization;
- transforming the risk factors into risk indicators;
- calculating an identity trust score based on the risk indicators wherein the risk indicators include an overall risk of a user account based on user patterns and previous alerts associated with the account, enterprise information security, and the user's social network to identify relationships indicating fraud and, wherein the risk indicators of the user include alerts related to the behavior of the user, wherein the alerts are determined by:
  - comparing the behavior of the user with behavior of a peer group of the user;
  - determining whether the behavior of the user deviates from the behavior of the peer group of the user above a threshold level; and
  - generating an alert when the behavior of the user deviates above the threshold level;
- comparing the identity trust score to an activity trust threshold for the requested activity;
- ranking authentication methods according to a level of invasiveness, wherein the most invasive authentication methods require user-provided information, wherein the least invasive authentication methods require no user-provided information; and
- generating an authentication plan that includes an authentication method, wherein the authentication plan is based on the comparison, the level of user invasiveness of the authentication method, and the channel used in requesting the activity.

* * * * *